(12) United States Patent
Kanazawa et al.

(10) Patent No.: US 10,189,011 B2
(45) Date of Patent: Jan. 29, 2019

(54) EXHAUST GAS PURIFYING CATALYST AND METHOD FOR PRODUCING THE SAME

(71) Applicants: Takaaki Kanazawa, Toyota (JP); Shunsuke Haga, Kakegawa (JP); Isao Naito, Kakegawa (JP); Akiya Chiba, Kakegawa (JP); Motoya Abe, Kakegawa (JP)

(72) Inventors: Takaaki Kanazawa, Toyota (JP); Shunsuke Haga, Kakegawa (JP); Isao Naito, Kakegawa (JP); Akiya Chiba, Kakegawa (JP); Motoya Abe, Kakegawa (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/701,723

(22) Filed: Sep. 12, 2017

(65) Prior Publication Data

US 2018/0071718 A1 Mar. 15, 2018

(30) Foreign Application Priority Data

Sep. 15, 2016 (JP) .................................. 2016-180695
Dec. 22, 2016 (JP) .................................. 2016-248664

(51) Int. Cl.
*B01J 21/04* (2006.01)
*B01J 21/06* (2006.01)
(Continued)

(52) U.S. Cl.
CPC ............ *B01J 23/42* (2013.01); *B01D 53/945* (2013.01); *B01J 23/10* (2013.01); *B01J 35/0026* (2013.01);
(Continued)

(58) Field of Classification Search
CPC . B01J 21/04; B01J 21/066; B01J 23/10; B01J 23/42; B01J 23/44; B01J 23/464;
(Continued)

(56) References Cited

U.S. PATENT DOCUMENTS 5,945,369 A * 8/1999 Kimura ................ B01D 53/945
502/304
7,214,643 B2 * 5/2007 Yamamoto ............. C01G 25/00
423/592.1
(Continued)

FOREIGN PATENT DOCUMENTS

JP 3379369 B2 2/2003
JP 4315857 B2 8/2009
JP 2016-209858 A 12/2016

*Primary Examiner* — Cam N. Nguyen
(74) *Attorney, Agent, or Firm* — Sughrue Mion, PLLC

(57) ABSTRACT

An exhaust gas purifying catalyst with an excellent effect of suppressing deterioration due to aggregation of a noble metal catalyst during endurance at high temperature, and a production method therefor. The method for producing the exhaust gas purifying catalyst that has a porous carrier and a noble metal catalyst supported thereon includes: preparing the porous carrier that contains alumina-ceria-zirconia composite oxide particles and has physical property values, after subjected to baking at 900° C. for 5 hours, of a pore diameter of the particles in the range of 2 to 20 nm, a specific surface area of the particles in the range of 75 to 115 m$^2$/g, a crystallite size of a ceria-zirconia composite oxide contained in the particles in the range of 4 to 6 nm, and a bulk density of the particles in the range of 0.5 to 0.9 cm$^3$/g, and bringing a noble metal chemical solution having an aggregate of platinum or the like with a grain size adjusted to less than or equal to 1 nm with the use of a platinum nitric acid solution or the like, into contact with the porous carrier, so that the noble metal catalyst is supported on the porous carrier.

3 Claims, 28 Drawing Sheets

(51) Int. Cl.
| | |
|---|---|
| B01J 23/10 | (2006.01) |
| B01J 23/42 | (2006.01) |
| B01J 23/44 | (2006.01) |
| B01J 23/46 | (2006.01) |
| B01J 23/63 | (2006.01) |
| B01J 35/00 | (2006.01) |
| B01J 35/02 | (2006.01) |
| B01J 35/10 | (2006.01) |
| B01J 37/02 | (2006.01) |
| B01J 37/08 | (2006.01) |
| B01D 53/94 | (2006.01) |
| F01N 3/10 | (2006.01) |
| F01N 3/28 | (2006.01) |

(52) U.S. Cl.
CPC ......... B01J 35/023 (2013.01); B01J 35/1014 (2013.01); B01J 35/1019 (2013.01); B01J 35/1061 (2013.01); B01J 37/0215 (2013.01); B01J 37/08 (2013.01); F01N 3/101 (2013.01); F01N 3/2803 (2013.01); *B01D 2255/1021* (2013.01); *B01D 2255/1023* (2013.01); *B01D 2255/1025* (2013.01); *B01D 2255/2065* (2013.01); *B01D 2255/2092* (2013.01); *B01D 2255/20715* (2013.01); *B01D 2255/40* (2013.01); *B01D 2255/407* (2013.01); *B01D 2255/9207* (2013.01); *F01N 2370/02* (2013.01)

(58) Field of Classification Search
CPC ...... B01J 23/63; B01J 35/0026; B01J 35/023; B01J 35/1014; B01J 35/1019; B01J 35/1061; B01J 37/0215; B01J 37/08
See application file for complete search history.

(56) References Cited

U.S. PATENT DOCUMENTS

| | | | | |
|---|---|---|---|---|
| 7,795,171 | B2* | 9/2010 | Maruki | C01G 25/00 |
| | | | | 502/300 |
| 7,875,250 | B2* | 1/2011 | Nunan | B01D 53/945 |
| | | | | 422/168 |
| 9,266,064 | B2* | 2/2016 | Weigert | B01D 53/9477 |
| 9,387,461 | B2* | 7/2016 | Wu | B01D 53/945 |
| 9,409,152 | B2* | 8/2016 | Kumatani | B01J 21/066 |
| 9,592,498 | B2* | 3/2017 | Larcher | B01J 21/12 |
| 9,597,666 | B2* | 3/2017 | Wu | B01D 53/945 |
| 9,656,209 | B2* | 5/2017 | Chang | B01D 53/945 |
| 9,694,349 | B2* | 7/2017 | Weigert | B01D 53/9477 |
| 9,707,545 | B2* | 7/2017 | Felix | B01D 53/945 |
| 2013/0336864 | A1* | 12/2013 | Zheng | B01J 23/63 |
| | | | | 423/213.5 |
| 2016/0296910 | A1* | 10/2016 | Wu | B01J 23/10 |
| 2016/0332144 | A1 | 11/2016 | Kanazawa | |
| 2018/0036715 | A1* | 2/2018 | Kanazawa | B01D 53/94 |

* cited by examiner

FIG. 9
| | EXAMPLE 1 | COMPARATIVE EXAMPLE 1 |
|---|---|---|
| Pt | 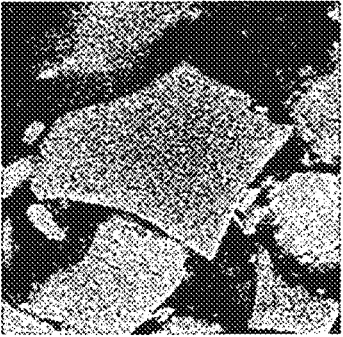 | 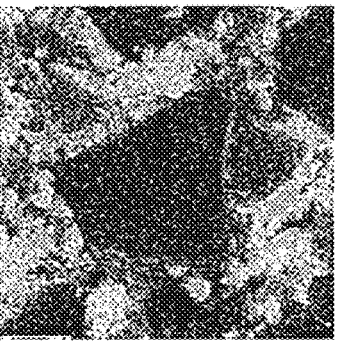 |
| Al | 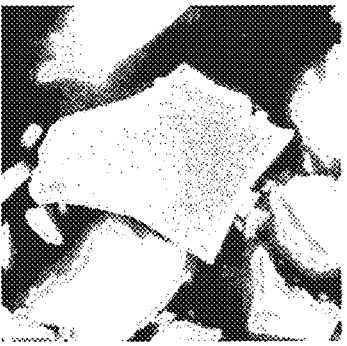 | 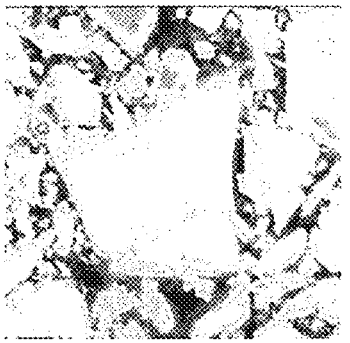 |

EXHAUST GAS PURIFYING CATALYST AND METHOD FOR PRODUCING THE SAME

CROSS REFERENCE TO RELATED APPLICATIONS

The present application claims priority from Japanese patent application JP2016-248664 filed on Dec. 22, 2016 and Japanese patent application JP2016-180695 filed on Sep. 15, 2016, the content of which is hereby incorporated by reference into this application.

BACKGROUND

Technical Field

The present disclosure relates to an exhaust gas purifying catalyst and a method for producing the same.

Background Art

In a variety of industries, a variety of attempts has been made worldwide to reduce environmental impacts and burdens. In particular, in the automobile industry, development for promoting the spread of not only fuel-efficient gasoline engine vehicles, but also so-called eco-friendly vehicles, such as hybrid vehicles and electric vehicles, as well as for further improving the performance of such vehicles has been advanced day by day. In addition to the development of such eco-friendly vehicles, research about an exhaust gas purifying catalyst for purifying exhaust gas discharged from an engine has also been actively conducted.

An exhaust gas purifying catalyst contains an oxidation catalyst, a three-way catalyst, an $NO_x$ storage-reduction catalyst, and the like. A noble metal catalyst, such as platinum (Pt), palladium (Pd), or rhodium (Rh), exhibits catalytic activity in such an exhaust gas purifying catalyst. The noble metal catalyst is typically used while being supported on a porous carrier made of a porous oxide, such as alumina ($Al_2O_3$).

A catalytic converter for purifying exhaust gas is typically arranged in an exhaust system for exhaust gas that connects a vehicle engine and a muffler. The engine may sometimes discharge environmentally harmful substances, such as CO, $NO_x$, and unburned HC and VOC. In order to convert such harmful substances into allowable substances, exhaust gas is passed through a catalytic converter in which a catalyst layer, which contains a noble metal catalyst, such as Rh, Pd, or Pt supported on a porous carrier, is arranged on the cell wall surface of a substrate, so that CO is converted into $CO_2$, and $NO_x$ is converted into $N_2$ and $O_2$, while VOC is burned to generate $CO_2$ and $H_2O$.

As a porous carrier on which a noble metal catalyst is supported, a ceria-zirconia composite oxide (which is also referred to as a $CeO_2$—$ZrO_2$ solid solution, a CZ material, and the like) can be used. This is also referred to as a promoter, and is an essential component of the aforementioned three-way catalyst for concurrently removing CO, $NO_x$, and HC that are harmful components in the exhaust gas. Examples of the essential component of the promoter include $CeO_2$.

$CeO_2$ has a property that its oxidation number changes to $Ce^{3+}$ or $Ce^{4+}$ depending on the partial pressure of oxygen in the exhaust gas to which $CeO_2$ is exposed, and has a function of absorbing or releasing oxygen as well as a function of storing oxygen (OSC: Oxygen Storage Capacity) to compensate for the excess or deficiency of electric charges. In addition, $CeO_2$ can absorb and mitigate fluctuations of the exhaust gas atmosphere and maintain the air/fuel ratio at a level around the theoretical air/fuel ratio in order to retain a purifying window of the three-way catalyst.

By the way, exhaust gas purifying catalysts have a problem in that they have deteriorated catalyst performance when exposed to high temperature. Thus, improvement in heat resistance is desired.

The conventional exhaust gas purifying catalysts have been developed with a view to, after endurance, avoid sintering of the porous carrier by forming a number of relatively large pores within the powder of the porous carrier in order to maintain the specific surface area of a porous carrier, which has a noble metal catalyst supported thereon.

However, when a number of relatively large pores are formed within the powder of a porous carrier, the effect of suppressing sintering (aggregation) of a noble metal catalyst would decrease, and further, when the volume of the powder of the porous carrier is increased, another problem may occur such that the amount of the catalyst that can be applied to a monolith is limited. Meanwhile, when the number of pores is reduced, the specific surface area of the porous carrier will decrease, and it becomes difficult for the porous carrier to support a noble metal catalyst thereon. Thus, it is quite difficult to adjust the number of pores from the perspective of both supporting a noble metal catalyst and suppressing the aggregation of the noble metal catalyst after endurance.

By the way, Patent Document 1 relates to an exhaust gas purifying catalyst that includes a porous carrier and catalytic noble metal supported on the porous carrier, and discloses an exhaust gas purifying catalyst in which the porous carrier contains particles of an aluminum-cerium-zirconium composite oxide produced from an metal alkoxide, and the composition of the particles in terms of the molar ratio is in the range of Ce/Zr=1/3 to 3/1 and Al/(Ce+Zr)=2 to 10.

In the exhaust gas purifying catalyst described in Patent Document 1, as the composition of the particles in terms of the molar ratio is adjusted in the range of Ce/Zr=1/3 to 3/1 and Al/(Ce+Zr)=2 to 10, OSC will hardly decrease even after endurance. Thus, a time for which the catalyst is exposed to a lean atmosphere is reduced, deterioration due to sintering of a noble metal catalyst and the like is suppressed, and the initial high activity can thus be maintained for a long time.

However, there is still room for improvement of the effect of suppressing deterioration due to sintering of a noble metal catalyst, more particularly, the effect of suppressing deterioration due to aggregation of a noble metal catalyst that would occur during endurance at a high temperature.

RELATED ART DOCUMENTS

Patent Documents

Patent Document 1: JP 3379369 B

SUMMARY

The present disclosure has been made in view of the foregoing, and provides an exhaust gas purifying catalyst that has an excellent effect of suppressing deterioration due to aggregation of a noble metal catalyst that would occur during endurance at a high temperature, and a method for producing the same.

The method for producing the exhaust gas purifying catalyst in accordance with the present disclosure is a method for producing an exhaust gas purifying catalyst that includes a porous carrier and a noble metal catalyst supported thereon, and the porous carrier contains particles of an alumina-ceria-zirconia composite oxide. The method includes preparing the porous carrier with physical property values, after subjected to baking at 900° C. for 5 hours, of a pore diameter of the particles in the range of 2 to 20 nm, a specific surface area of the particles in the range of 75 to 115 m$^2$/g, a crystallite size of a ceria-zirconia composite oxide that is contained in the particles in the range of 4 to 6 nm, and a bulk density of the particles in the range of 0.5 to 0.9 cm$^3$/g, and bringing a noble metal chemical solution into contact with the porous carrier, the noble metal chemical solution having an aggregate of one of platinum, palladium, or rhodium with a grain size adjusted to less than or equal to 1 nm with the use of one of a platinum nitric acid solution, palladium nitric acid solution, or rhodium nitric acid solution, so that the noble metal catalyst is supported on the porous carrier, and the exhaust gas purifying catalyst is produced.

Herein, "one of platinum, palladium, or rhodium nitric acid solution" can be referred to as a "noble metal chemical solution," and the "aggregate of one of platinum, palladium, or rhodium with a grain size . . . " can be referred to as a "noble metal chemical solution with a grain size . . . " Further, the "aggregate of one of platinum, palladium, or rhodium" indicates an aggregate of a given amount of one of platinum, palladium, or rhodium, and a lump thereof that can be observed using the dynamic light scattering method.

The production method of the present disclosure includes bringing a noble metal chemical solution, in which the grain size has been adjusted to less than or equal to 1 nm with the use of one of a platinum nitric acid solution, palladium nitric acid solution, or rhodium nitric acid solution, into contact with a porous carrier of an alumina-ceria-zirconia composite oxide containing particles with a pore diameter in the range of 2 to 20 nm, so that one of platinum, palladium, or rhodium is supported on the porous carrier, thereby allowing a noble metal catalyst to be sufficiently supported within the pores with a diameter in the range of 2 to 20 nm. It should be noted that the alumina-ceria-zirconia composite oxide of the exhaust gas purifying catalyst of the present disclosure can be produced so as to have particles with a small pore diameter, through, for example, hydrolyzation of aluminum isopropoxide added to an aqueous solution containing a cerium salt and a zirconium salt.

The porous carrier containing the particles of the alumina-ceria-zirconia composite oxide has, in addition to the pore diameter of the composite oxide particles set in the range of 2 to 20 nm as a physical property value after subjected to baking at 900° C. for 5 hour, the specific surface area of the composite oxide particles, the crystallite size of the ceria-zirconia composite oxide that is contained in the composite oxide particles, and the bulk density of the composite oxide particles that are set in the range of 75 to 115 m$^2$/g, in the range of 4 to 6 nm, and in the range of 0.5 to 0.9 cm$^3$/g, respectively, so that the aggregation of the noble metal catalyst during endurance at a high temperature can be effectively suppressed.

Specifically, as the pore diameter of the composite oxide particles is set in the range of 2 to 20 nm, the noble metal catalyst is supported only within the pores. Thus, the aggregation of the noble metal catalyst during endurance at a high temperature is suppressed, and the decrease in the activity is suppressed.

In addition, as the bulk density of the composite oxide particles is set in the range of 0.5 to 0.9 cm$^3$/g, the bulk density can be reduced to about a half that of the conventional common particles. Thus, it is possible to coat a monolith by an area about double that of the conventional products.

In addition, as the crystallite size of the ceria-zirconia composite oxide (CZ material) contained in the composite oxide particles is in the range of 4 to 6 nm, and with the combined effect of suppressing the aggregation of the noble metal catalyst described above, a high OSC level with high durability can be obtained.

Herein, as the noble metal catalyst supported on the porous carrier, platinum (Pt), palladium (Pd), or rhodium (Rh) can be used, either alone or in combination.

If a noble metal chemical solution that has a grain size greater than 1 nm or that is to be quickly supported (adsorption speed is high) is used for the porous carrier with a pore diameter in the range of 2 to 20 nm, a phenomenon that the noble metal chemical solution tends to be supported on the outer surface of the porous carrier instead of entering the inside of the pores is likely to occur. Further, the noble metal chemical solution supported on the outer surface of the porous carrier aggregates, which results in generating wasted noble metal.

Therefore, in the production method of the present disclosure, the noble metal chemical solution of platinum, palladium, or rhodium with a grain size adjusted to less than or equal to 1 nm is brought into contact with the porous carrier, so that the noble metal catalyst is supported on the porous carrier, thereby allowing the noble metal chemical solution to effectively enter the inside of the pores with a diameter in the range of 2 to 20 nm so as to prevent the generation of wasted noble metal.

Herein, "the noble metal chemical solution . . . is brought into contact with the porous carrier" means a method of immersing the porous carrier in the noble metal chemical solution or applying the noble metal chemical solution to the surface of the porous carrier.

Accordingly, the method for producing the exhaust gas purifying catalyst of the present disclosure that an aggregate of platinum or the like with a grain size adjusted to less than or equal to 1 nm is allowed to sufficiently enter pores with a diameter in the range of 2 to 20 nm of composite oxide particles of the porous carrier, so that the noble metal catalyst is supported on the porous carrier, is novel and has never appeared in the past.

According to the present inventors, it is considered that the foregoing can be realized because the grain size of the aggregate of platinum or the like is adjusted to less than or equal to 1 nm. That is, even when the pores are micropores with a diameter in the range of 2 to 20 nm, it becomes easy for the aggregate to rapidly contact and be adsorbed onto the inner walls of the micropores.

Further, the present disclosure also relates to an exhaust gas purifying catalyst that includes a porous carrier and a noble metal catalyst supported thereon. In the exhaust gas purifying catalyst, the porous carrier contains aluminum-cerium-zirconium composite oxide particles and has physical property values, after subjected to baking at 900° C. for 5 hours, of a pore diameter of the particles in the range of 2 to 20 nm, a specific surface area of the particles in the range of 75 to 115 m$^2$/g, a crystallite size of a ceria-zirconia composite oxide that is contained in the particles in the range of 4 to 6 nm, and a bulk density of the particles in the range of 0.5 to 0.9 cm$^3$/g, and the correlation coefficient of the concentrations between the noble metal catalyst and Al of the porous carrier is greater than or equal to 0.2 in each of 256×256 regions obtained through division of a field of view of 87.04×87.04 μm of an electron microscope with a magnification of 1000×.

The present inventors divided the field of view (87.04× 87.04 μm in size) of the electron microscope with a magnification of 1000× into 256×256 regions and measured the peak concentration values of the noble metal catalyst (platinum, palladium, or rhodium) and Al of the porous carrier at each lattice point of 0.34×0.34 μm to calculate the correlation coefficient of the peak concentration values therebetween.

As a result, it was confirmed that when the correlation coefficient is in the range of greater than or equal to 0.2, the noble metal catalyst is sufficiently supported within the micropores with a diameter in the range of 2 to 20 nm.

As understood from the foregoing description, according to the exhaust gas purifying catalyst and the method for producing the same of the present disclosure, a noble metal chemical solution, in which the grain size has been adjusted to less than or equal to 1 nm with the use of one of a platinum nitric acid solution, palladium nitric acid solution, or rhodium nitric acid solution, is brought into contact with a porous carrier of an alumina-ceria-zirconia composite oxide containing particles having a pore diameter in the range of 2 to 20 nm as a physical property value after subjected to baking at 900° C. for 5 hour, so that one of platinum, palladium, or rhodium is supported on the porous carrier, thereby allowing the noble metal catalyst to be sufficiently supported within the pores with a diameter in the range of 2 to 20 nm. As a result, it is possible to produce an exhaust gas purifying catalyst that has an excellent effect of suppressing deterioration due to aggregation of the noble metal catalyst that would occur during endurance at a high temperature.

BRIEF DESCRIPTION OF THE DRAWINGS

FIG. 4A is a graph showing the measurement results at the initial stage (before endurance) and FIG. 4B shows the measurement results after endurance;

FIG. 9 shows EPMA images of Example 1 and Comparative Example 1;

DETAILED DESCRIPTION

Figure 1:
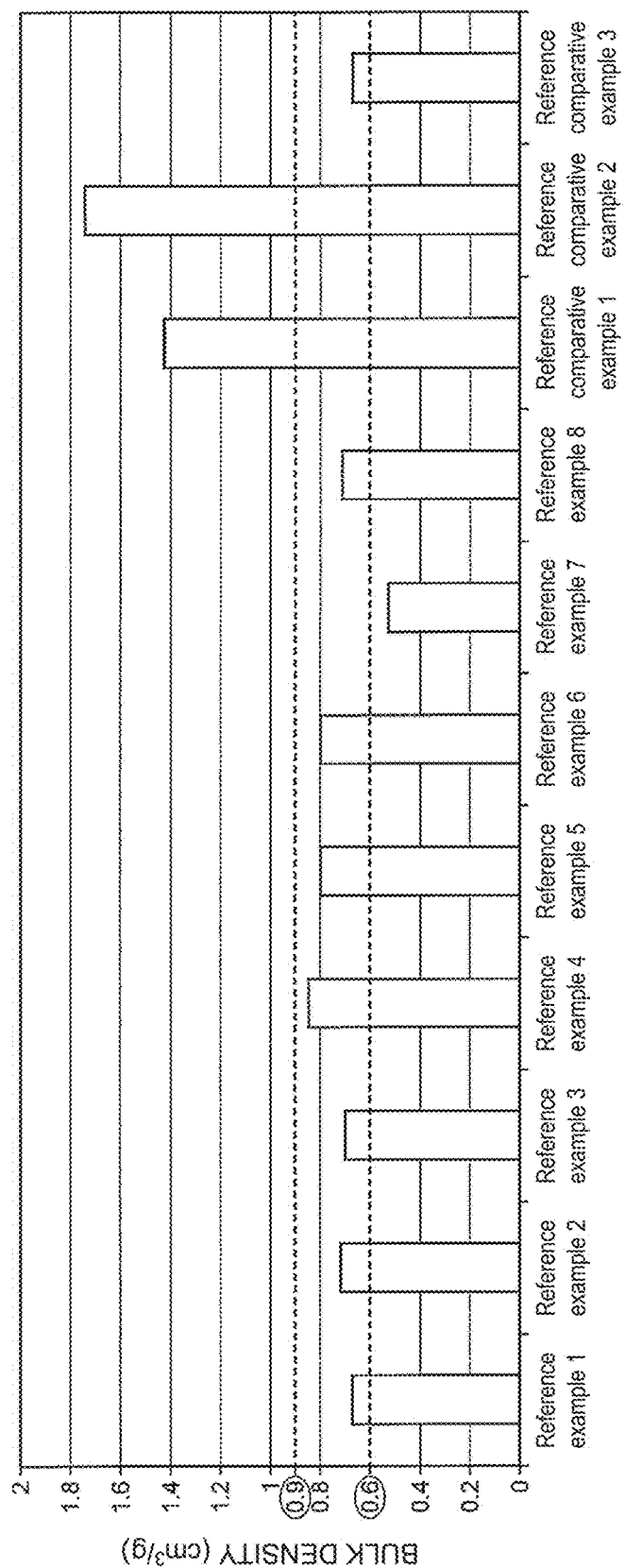
FIG. 1 is a graph showing the measurement results of the bulk density of a composite oxide of each of reference examples and reference comparative examples.

Hereinafter, embodiments of the exhaust gas purifying catalyst and the method for producing the same of the present disclosure will be described with reference to the drawings.

The method for producing the exhaust gas purifying catalyst of the present disclosure is a method for producing an exhaust gas purifying catalyst that includes a porous carrier and a noble metal catalyst supported thereon. Specifically, first, a porous carrier that contains particles of an alumina-ceria-zirconia composite oxide is produced. The porous carrier has physical property values, after subjected to baking at 900° C. for 5 hours, of a pore diameter of the particles in the range of 2 to 20 nm, a specific surface area of the particles in the range of 75 to 115 m$^2$/g, a crystallite size of a ceria-zirconia composite oxide that is contained in the particles in the range of 4 to 6 nm, and a bulk density of the particles in the range of 0.5 to 0.9 cm$^3$/g.

In the process of producing the alumina-ceria-zirconia composite oxide, not ethylene glycol but distilled water was used as a solvent for dissolving Ce(NO$_3$)$_3$6H$_2$O and ZrO(NO$_3$)$_2$2H$_2$O, whereby it was found to be possible to increase the specific surface area of the alumina-ceria-zirconia composite oxide. In addition, the baking conditions were changed from low-temperature, short-time baking in the conventional production methods to high-temperature, long-time baking (at about 900° C. or higher and for about 5 hours or longer), whereby it was found to be possible to increase the proportion of mesopores with a diameter in the range of about 2 to 20 nm that are formed in the alumina-ceria-zirconia composite oxide carrier. Consequently, it is possible to suppress the aggregation of the noble metal catalyst during endurance at a high temperature.

The produced porous carrier is immersed in a noble metal chemical solution, such as a platinum nitric acid solution, palladium nitric acid solution, or rhodium nitric acid solution.

In the aforementioned noble metal chemical solution, the grain size of an aggregate of platinum, palladium, or rhodium has been adjusted to less than or equal to 1 nm.

The adjusting method will be briefly described taking a platinum nitric acid solution as an example. Platinum crystals are added to and dissolved in a mixed solution of nitric acid and pure water so that the weight ratio of platinum to pure nitric acid becomes below a predetermined value and the platinum concentration is within a predetermined range. Then, the mixed solution with platinum is boiled at around 100° C. for a predetermined amount of time less than 100 hours at normal pressure so as to effect a reaction of increasing the valence of platinum in the solution from bivalence to quadrivalence and age the solution with platinum, so that the grain size of the aggregate of platinum can be adjusted to less than or equal to 1 nm.

The noble metal chemical solution in which the grain size has been adjusted to less than or equal to 1 nm sufficiently enters the pores with a diameter in the range of 2 to 20 nm of the porous carrier, rapidly contacts and is adsorbed onto the inner walls of the pores, and thus is supported on the carrier, so that the exhaust gas purifying catalyst of the present disclosure is produced.

The present inventors have confirmed that in the produced exhaust gas purifying catalyst, the correlation coefficient of the concentrations between the noble metal catalyst and Al of the porous carrier is greater than or equal to 0.2 in each of 256×256 regions obtained through division of a field of view of 87.04×87.04 μm of an electron microscope with a magnification of 1000×. The present inventors have further confirmed that the exhaust gas purifying catalyst has an excellent effect of suppressing deterioration due to aggregation of the noble metal catalyst that would occur during endurance at high temperature.

(Various Experiments for Verifying the Performance of the Porous Carrier of the Exhaust Gas Purifying Catalyst of the Present Disclosure and the Results Thereof)

The present inventors produced a specimen of each of composite oxides of Reference Examples 1 to 8 and Reference Comparative Examples 1 to 3 shown below and then produced a specimen of an exhaust gas purifying catalyst by making each of the composite oxides support a noble metal catalyst thereon, and verified the performance of the porous carrier of the exhaust gas purifying catalyst of the present disclosure.

REFERENCE EXAMPLE 1

47.1 g Ce(NO$_3$)$_3$.6H$_2$O and 52.1 g ZrO(NO$_3$)$_2$.2H$_2$O were dissolved in 400 cc (cm$^3$) distilled water, and the mixture was agitated at 85° C. Then, 80.1 g Al(OC$_3$H$_7$)$_3$ was slowly added to the mixture while the dissolution thereof was being checked. After Al(OC$_3$H$_7$)$_3$ was dissolved in the mixture, moisture was completely removed at 90° C. with a rotary evaporator, and baking was performed at 900° C. for 5 hours to produce a composite oxide of Al$_2$O$_3$:CeO$_2$:ZrO$_2$ with a ratio of 32:30:38.

REFERENCE EXAMPLE 2

A composite oxide was produced under the same conditions as those in Reference Example 1 except that the amount of distilled water in Reference Example 1 was changed to 800 cc.

REFERENCE EXAMPLE 3

A composite oxide was produced under the same conditions as those in Reference Example 1 except that the amount of distilled water in Reference Example 1 was changed to 1200 cc.

REFERENCE EXAMPLE 4

A composite oxide was produced under the same conditions as those in Reference Example 1 except that 8 cc 60% nitric acid solution was added after Al(OC$_3$H$_7$)$_3$ was dissolved in Reference Example 1.

REFERENCE EXAMPLE 5

A composite oxide was produced under the same conditions as those in Reference Example 1 except that 4 cc 60% nitric acid solution was added after Al(OC$_3$H$_7$)$_3$ was dissolved in Reference Example 2.

REFERENCE EXAMPLE 6

A composite oxide was produced under the same conditions as those in Reference Example 1 except that 8 cc 60% nitric acid solution was added after Al(OC$_3$H$_7$)$_3$ was dissolved in Reference Example 2.

REFERENCE EXAMPLE 7

25.3 g Ce(NO$_3$)$_3$.6H$_2$O and 47.7 g ZrO(NO$_3$)$_2$.2H$_2$O were dissolved in 600 cc (cm$^3$) distilled water, and the mixture was agitated at 85° C. Then, 60.2 g Al(OC$_3$H$_7$)$_3$ was slowly added to the mixture while the dissolution thereof was being checked. After Al(OC$_3$H$_7$)$_3$ was dissolved in the mixture, moisture was completely removed at 90° C. with a rotary evaporator, and baking was performed at 900° C. for 5 hours to produce a composite oxide of Al$_2$O$_3$:CeO$_2$:ZrO$_2$ with a ratio of 32:21:47.

REFERENCE EXAMPLE 8

70.7 g Ce(NO$_3$)$_3$.6H$_2$O and 78.2 g ZrO(NO$_3$)$_2$.2H$_2$O were dissolved in 1500 cc (cm$^3$) distilled water, and the mixture was agitated at 85° C. Then, 384.3 g Al(OC$_3$H$_7$)$_3$ was slowly added to the mixture while the dissolution thereof was being checked. After Al(OC$_3$H$_7$)$_3$ was dissolved in the mixture, moisture was completely removed at 90° C. with a rotary evaporator, and baking was performed at 900° C. for 5 hours to produce a composite oxide of $Al_2O_3$:$CeO_2$:$ZrO_2$ with a ratio of 60:18:22.

REFERENCE COMPARATIVE EXAMPLE 1

Instead of $Al(OC_3H_7)_3$, 147 g $Al(NO_3)_3 \cdot 9H_2O$ that contains nitrate was used to produce a 1 L aqueous nitrate solution containing Al, Ce, and Zr. Then, an aqueous sodium carbonate solution was added until the pH became 10 and a precipitate was generated. Then, cleaning through filtration was conducted five times, which was then followed by drying at 120° C. and baking at 900° C. for 5 hours so that a composite oxide was produced.

REFERENCE COMPARATIVE EXAMPLE 2

A composite oxide was produced under the same conditions as those in Reference Comparative Example 1 except that, instead of the aqueous sodium carbonate solution in Reference Comparative Example 1, an aqueous ammonia solution was used and added until the pH became 10 and a precipitate was generated.

REFERENCE COMPARATIVE EXAMPLE 3

In Reference Example 1, a solution obtained by dissolving 47.1 g $Ce(NO_3)_3 \cdot 6H_2O$ in 100 cc ethylene glycol was produced in advance, and the solution was added after $Al(OC_3H_7)_3$ was added. This is the same method as that described in an embodiment of Patent Document 1 (JP 3379369 B) above.

<Method for Evaluating the Catalyst Performance>

An exhaust gas purifying catalyst was produced by making 1 mass % Pt support on each of the composite oxides of Reference Examples 1 to 8 and Reference Comparative Examples 1 to 3, and then, an endurance test at 1100° C. for 5 hours was executed on each exhaust gas purifying catalyst to evaluate the performance thereof after the endurance test.

RESULTS OF EXPERIMENTS

Figure 2:
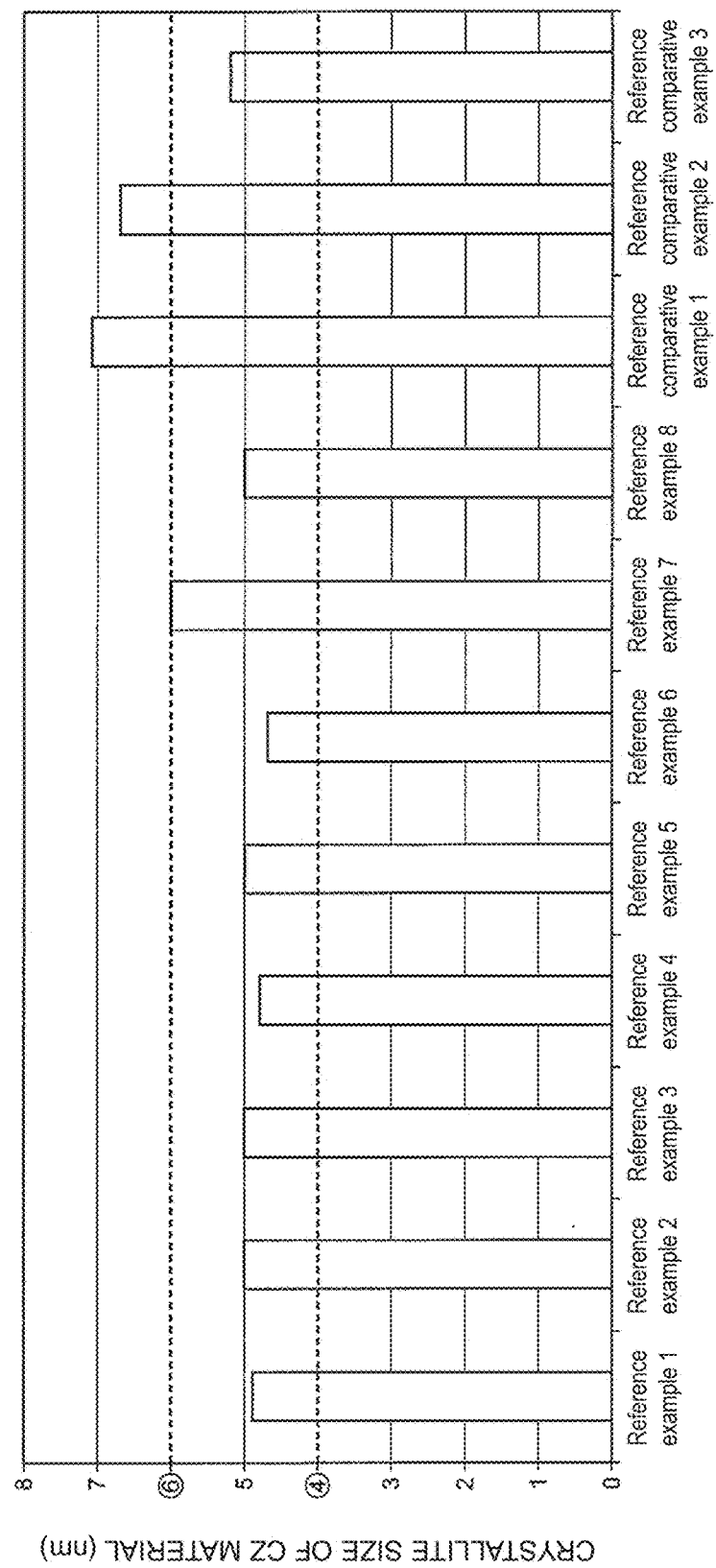
FIG. 2 is a graph showing the measurement results about the crystallite size of a CZ material as a composite oxide of each of reference examples and reference comparative examples.
Figure 3:
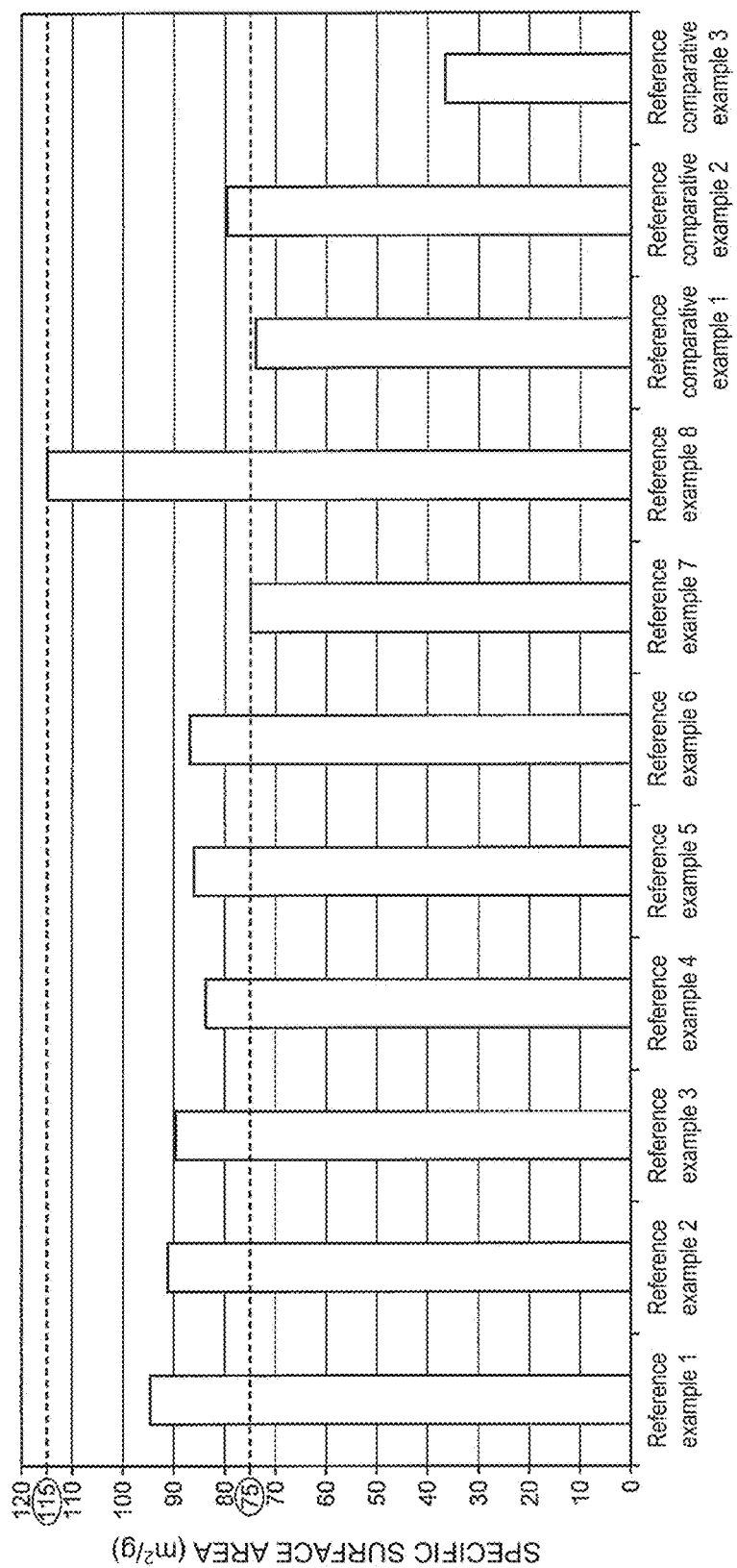
FIG. 3 is a graph showing the measurement results of the specific surface area of a composite oxide of each of reference examples and reference comparative examples.
Figure 4A:
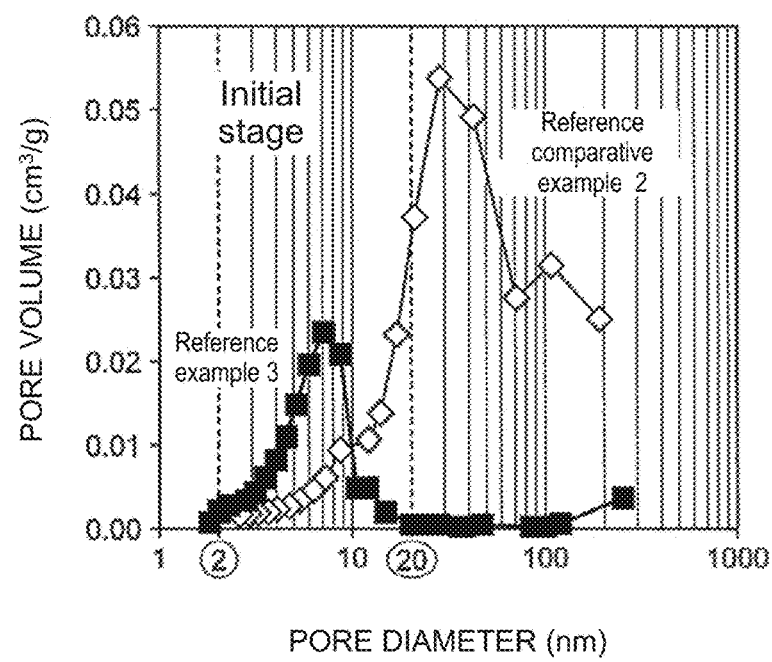
FIGS. 4A and 4B are graphs showing the measurement results of the pore diameter of a composite oxide of each of reference examples and reference comparative examples; specifically.
Figure 4B:
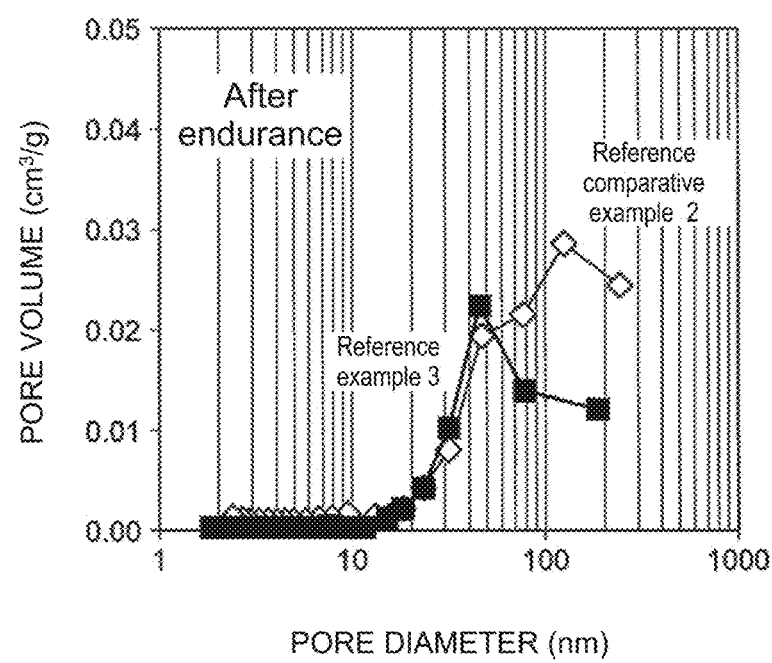
Figure 5:
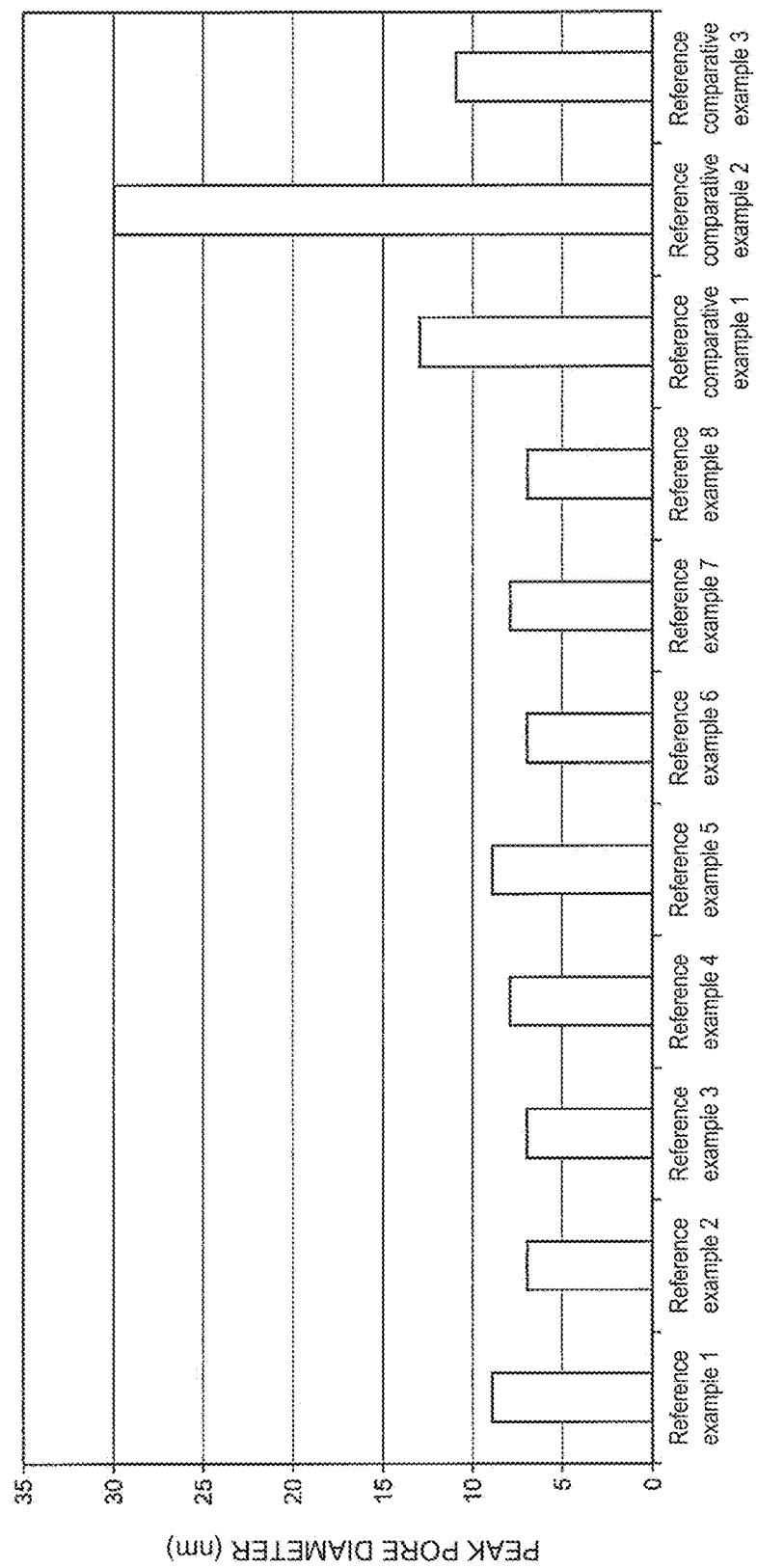
FIG. 5 is a graph showing the measurement results of the peak pore diameter of a composite oxide of each of reference examples and reference comparative examples.
Figure 6:
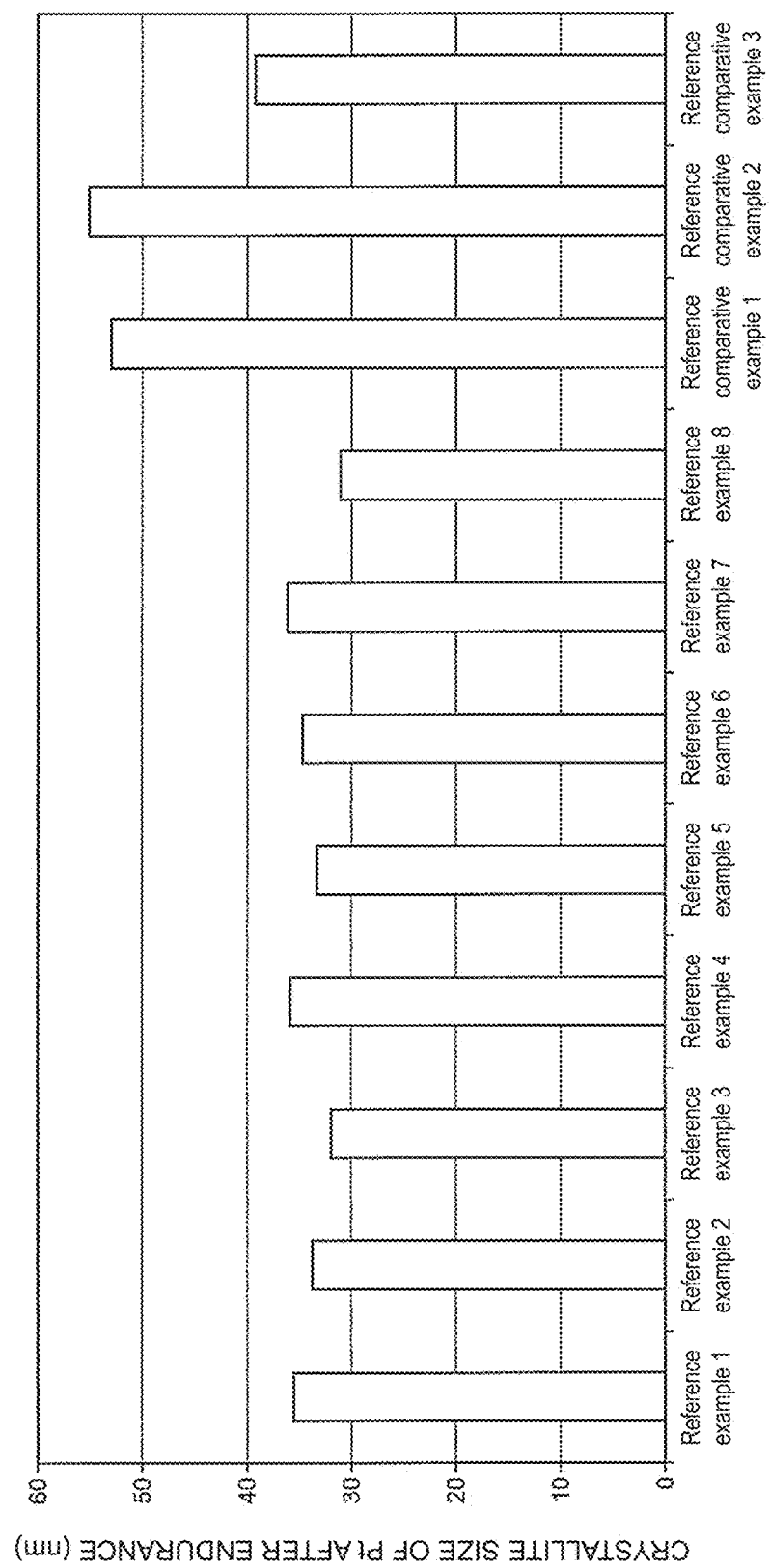
FIG. 6 is a graph showing the measurement results about the Pt crystallite size after endurance of a composite oxide of each of reference examples and reference comparative examples.
Figure 7:
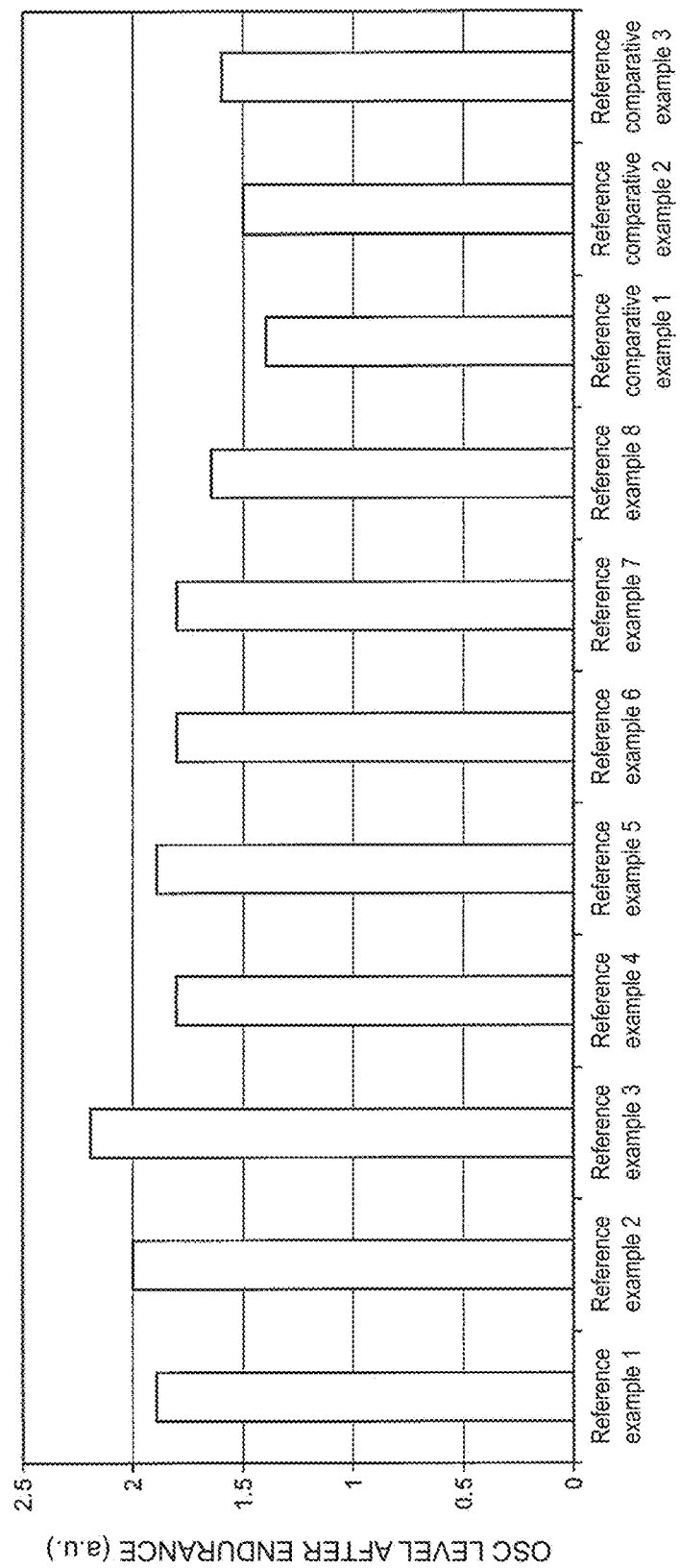
FIG. 7 is a graph showing the measurement results of the OSC level after endurance of each of reference examples and reference comparative examples.
Figure 8:
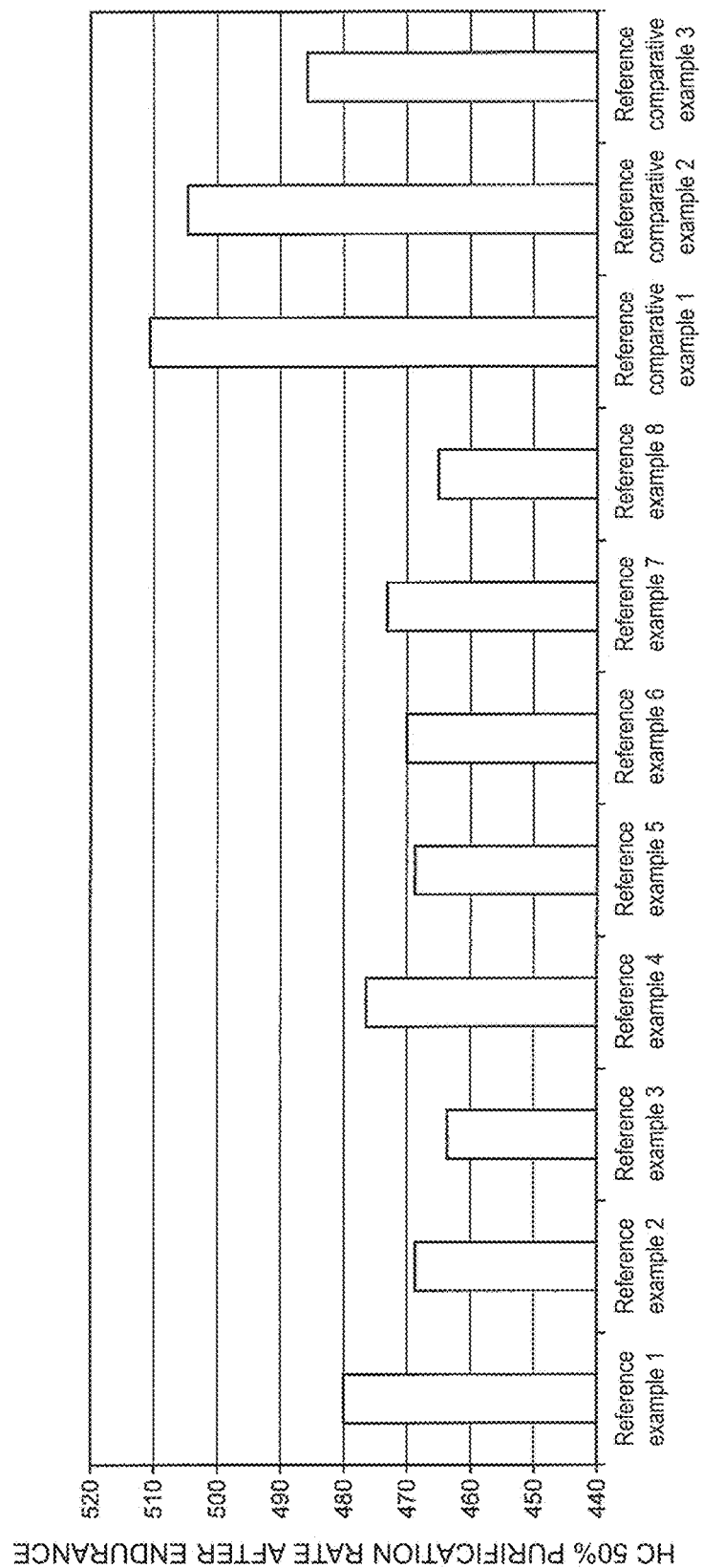
FIG. 8 is a graph showing the measurement results about the HC 50% purification rate after endurance of each of reference examples and reference comparative examples.

FIGS. 1 to 5 and Table 1 show the measurement results before the endurance tests, and FIGS. 6 to 8 and Table 2 show the results of the catalyst performance after the endurance tests. Herein, FIG. 1 is a graph showing the measurement results of the bulk density of each specimen. FIG. 2 is a graph showing the measurement results about the crystallite size of a CZ material of each specimen. FIG. 3 is a graph showing the measurement results of the specific surface area of each specimen. FIGS. 4 are graphs showing the measurement results of the pore diameter of each specimen; specifically, FIG. 4A is a graph showing the measurement results at the initial stage (before endurance) and FIG. 4B shows the measurement results after endurance. FIG. 5 is a graph showing the measurement results of the peak pore diameter of a composite oxide of each of reference examples and reference comparative examples.

TABLE 1

| | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|
| Peak Pore Diameter (nm) | 9 | 7 | 7 | 8 | 9 | 7 | 8 | 7 |
| Bulk Density ($cm^3/g$) | 0.678 | 0.73 | 0.71 | 0.847 | 0.793 | 0.806 | 0.53 | 0.71 |
| Specific Surface Area ($m^2/g$) | 94.6 | 91.6 | 89.9 | 84.6 | 86.4 | 87.2 | 75 | 115 |
| Crystallite Size of CZ Material (nm) | 4.9 | 5 | 5 | 4.8 | 5 | 4.7 | 6 | 5 |

| | Reference Comparative Example 1 | Reference Comparative Example 2 | Reference Comparative Example 3 |
|---|---|---|---|
| Peak Pore Diameter (nm) | 13 | 30 | 11 |
| Bulk Density ($cm^3/g$) | 1.43 | 1.74 | 0.685 |
| Specific Surface Area ($m^2/g$) | 74.5 | 79.7 | 36.9 |
| Crystallite Size of CZ Material (nm) | 7.1 | 6.7 | 5.2 |

First, referring to FIG. 1 and Table 1, the bulk density of each specimen was measured in accordance with JIS R1628: 1997. FIG. 1 confirms that the bulk density of each of Reference Comparative Examples 1 to 3 was in the range of 0.7 to 1.7 cm$^3$/g, while the bulk density of each of Reference Examples 1 to 8 was in the range of 0.5 to 0.9 cm$^3$/g, which is about a half the bulk density of Reference Comparative Example 1 or 2. This means that the amount of the catalyst that can be applied to a monolith in each of Reference Examples 1 to 8 is about double that of Reference Comparative Example 1 or 2.

Next, referring to FIG. 2 and Table 1, the crystallite size of the CZ material of each specimen was measured using an X-ray diffraction method in accordance with JIS H7805: 2005. FIG. 2 confirms that the crystallite size of the CZ material of each of Reference Comparative Examples 1 to 3 was in the range of 5 to 7 nm, while the crystallite size of the CZ material of each of Reference Examples 1 to 8 was in the range of 4 to 6 nm.

Next, referring to FIG. 3 and Table 1, the specific surface area of each specimen was measured in accordance with JIS R1626:1996. FIG. 3 confirms that the specific surface area of each of Reference Comparative Examples 1 to 3 was in the range of 35 to 80 m$^2$/g, while the specific surface area of each of Reference Examples 1 to 8 was in the range of 75 to 115 m$^2$/g.

Next, referring to FIG. 4A, Reference Example 3 and Reference Comparative Example 2 that exhibited favorable results of the endurance tests were extracted to measure the initial pore diameters of the specimens before the endurance tests. Distributions of the pore diameters are shown herein. It is seen that the peak of the pore diameter of Reference Example 3 was in the range of 2 to 20 nm. It should be noted that the peak of the pore diameter of Reference Comparative Example 2 was in the range of about 10 to 70 nm.

FIG. 4B confirms that a distribution of the pore diameter of Reference Example 3 after the endurance test had a peak in the range of about 20 to 70 nm, and that of Reference Comparative Example 2 after the endurance test had a peak in the range of about 70 to 120 nm. Thus, it was found that the pore diameter of each specimen has changed from the result shown in FIG. 4A by several tens of nm.

Next, from FIG. 5 and Table 1, it was found that the peak of the pore diameter (i.e., peak pore diameter) of the CZ material of each of the specimens of Reference Examples 1 to 8, which has been measured with a nitrogen adsorption method, was less than or equal to 10 nm, while that of each of Reference Comparative Examples 1 to 3 tended to be over 10 nm.

Next, evaluation of the catalyst performance after endurance will be discussed with reference to FIGS. 6 to 8 and Table 2. Herein, FIG. 6 is a graph showing the measurement results about the Pt crystallite size after endurance of each specimen. FIG. 7 is a graph showing the measurement results of the OSC level after endurance of each specimen. FIG. 8 is a graph showing the measurement results about the HC 50% purification rate after endurance of each specimen.

TABLE 2

| | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|
| Pt Grain Size after Endurance (nm) | 35.6 | 33.9 | 32.1 | 36 | 33.2 | 34.7 | 36 | 31 |
| OSC Level after Endurance (a.u.) | 1.9 | 2 | 2.2 | 1.8 | 1.9 | 1.8 | 1.8 | 1.65 |
| HC 50% Purification Rate after Endurance | 480 | 469 | 464 | 477 | 469 | 470 | 473 | 465 |

| | Reference Comparative Example 1 | Reference Comparative Example 2 | Reference Comparative Example 3 |
|---|---|---|---|
| Pt Grain Size after Endurance (nm) | 53.1 | 55.2 | 39.1 |
| OSC Level after Endurance (a.u.) | 1.4 | 1.5 | 1.6 |
| HC 50% Purification Rate after Endurance | 511 | 505 | 486 |

Referring to FIG. 6 and Table 2, the Pt crystallite size of each specimen was measured using an X-ray diffraction method in accordance with JIS H7805:2005. FIG. 6 confirms that the Pt crystallite size after endurance of each of Reference Comparative Examples 1 to 3 was as large as about 40 to 55 nm, while the Pt crystallite size after endurance of each of Reference Examples 1 to 8 was about 31 to 36 nm, which are much smaller than those of the reference comparative examples.

This is because the aggregation of Pt during endurance at a high temperature is suppressed in Reference Examples 1 to 8.

Next, from FIG. 7 and Table 2, it was found that the OSC level (oxygen storage capacity) after endurance of each of Reference Comparative Examples 1 to 3 was 1.4 to 1.6

(a.u.), while the OSC level after endurance of each of Reference Examples 1 to 8 was about 1.7 to 2.2 (a.u.), which are higher than those of the reference comparative examples by 40% or more.

Further, from FIG. 8 and Table 2, it was found that the HC 50% purification rate after endurance of each of Reference Comparative Examples 1 to 3 was about 490 to 510, while the HC 50% purification rate after endurance of each of Reference Examples 1 to 8 was about 460 to 480, which shows that the HC purification performance of each reference example is high.

Based on the results in FIGS. 1 to 5, the following conditions were defined for particles of an alumina-ceria-zirconia composite oxide that forms the exhaust gas purifying catalyst of the present disclosure: a pore diameter of the composite oxide particles in the range of 2 to 20 nm, a specific surface area of the composite oxide particles in the range of 75 to 115 $m^2/g$, a crystallite size of a ceria-zirconia composite oxide that is contained in the composite oxide particles in the range of 4 to 6 nm, and a bulk density of the composite oxide particles in the range of 0.5 to 0.9 $cm^3/g$.

In addition, the results in FIGS. 6 to 8 demonstrate that according to the exhaust gas purifying catalyst containing the composite oxide of the present disclosure, it is possible to effectively suppress the aggregation of a noble metal catalyst after the endurance tests, increase the OSC level, and increase the HC purification rate.

(Various Experiments for Verifying the Performance of the Exhaust Gas Purifying Catalyst of the Present Disclosure and the Results Thereof)

The present inventors produced specimens of the exhaust gas purifying catalyst of Examples 1 to 4 and Comparative Examples 1 to 7 shown below and verified their performance. First, experiments conducted on Example 1 and Comparative Examples 1 to 3, in which Pt was used as the noble metal catalyst, and the results thereof will be explained, followed by explanation of experiments conducted on Examples 2 and 3 and Comparative Examples 4 and 5, in which Pd was used as the noble metal catalyst, and the results thereof, and lastly, experiments conducted on Example 4 and Comparative Examples 6 and 7, in which Rh was used as the noble metal catalyst, and the results thereof will be explained.

EXAMPLE 1

47.1 g $Ce(NO_3)_3 \cdot 6H_2O$ and 52.1 g $ZrO(NO_3)_2 \cdot 2H_2O$ were each dissolved in 400 cc distilled water, and the mixture was agitated at 85° C. Then, 80.1 g $Al(OC_3H_7)_3$ was added thereto while being dissolved therein. After $Al(OC_3H_7)_3$ was dissolved in the mixture, moisture was completely removed at 90° C. with a rotary evaporator, and baking was performed at 900° C. for 5 hours to produce an alumina-ceria-zirconia composite oxide of $Al_2O_3:CeO_2:ZrO_2$ with a ratio of 32:30:38 having a peak pore diameter in the range of 2 to 20 nm, so that a 1 mass % platinum nitric acid chemical solution with a grain size of 0.9 nm as the noble metal chemical solution was supported on the composite oxide. Herein, changing the conditions of preparing the platinum nitric acid chemical solution can change the degree of polymerization, that is, the size of a platinum compound. Further, the supporting property can also be changed at the same time. Therefore, it is possible to prepare a noble metal chemical solution suitable for a porous carrier with a specific pore diameter. The grain size of the noble metal chemical solution was measured using a dynamic light scattering (DLS) method with Zetasizer nano-s (produced by Malvern Instruments Ltd.).

COMPARATIVE EXAMPLE 1

A 1 mass % platinum nitric acid chemical solution that had been aged to the extent that the grain size reached 1.5 nm was supported on an alumina-ceria-zirconia composite oxide with a peak pore diameter in the range of 2 to 20 nm that had been synthesized similarly to Example 1.

COMPARATIVE EXAMPLE 2

Instead of $Al(OC_3H_7)_3$, 147 g $Al(NO_3)_3 \cdot 9H_2O$, in which Al is also nitrate, was used to produce a 1 L aqueous nitrate solution containing Al, Ce, and Zr. Then, an aqueous sodium carbonate solution was added until the pH became 10 and a precipitate was generated. Then, cleaning through filtration was conducted five times, which was then followed by drying at 120° C. and baking at 900° C. for 5 hours, so that an alumina-ceria-zirconia composite oxide with a peak pore diameter of 30 nm was produced. Then, a 1 mass % platinum nitric acid chemical solution with a grain size of 0.9 nm was supported on the alumina-ceria-zirconia composite oxide.

COMPARATIVE EXAMPLE 3

A 1 mass % platinum nitric acid chemical solution that had been aged to the extent that the grain size reached 1.5 nm was supported on an alumina-ceria-zirconia composite oxide with a peak pore diameter of 30 nm that had been synthesized similarly to Comparative Example 2.

RESULTS OF EXPERIMENTS

Figure 10:
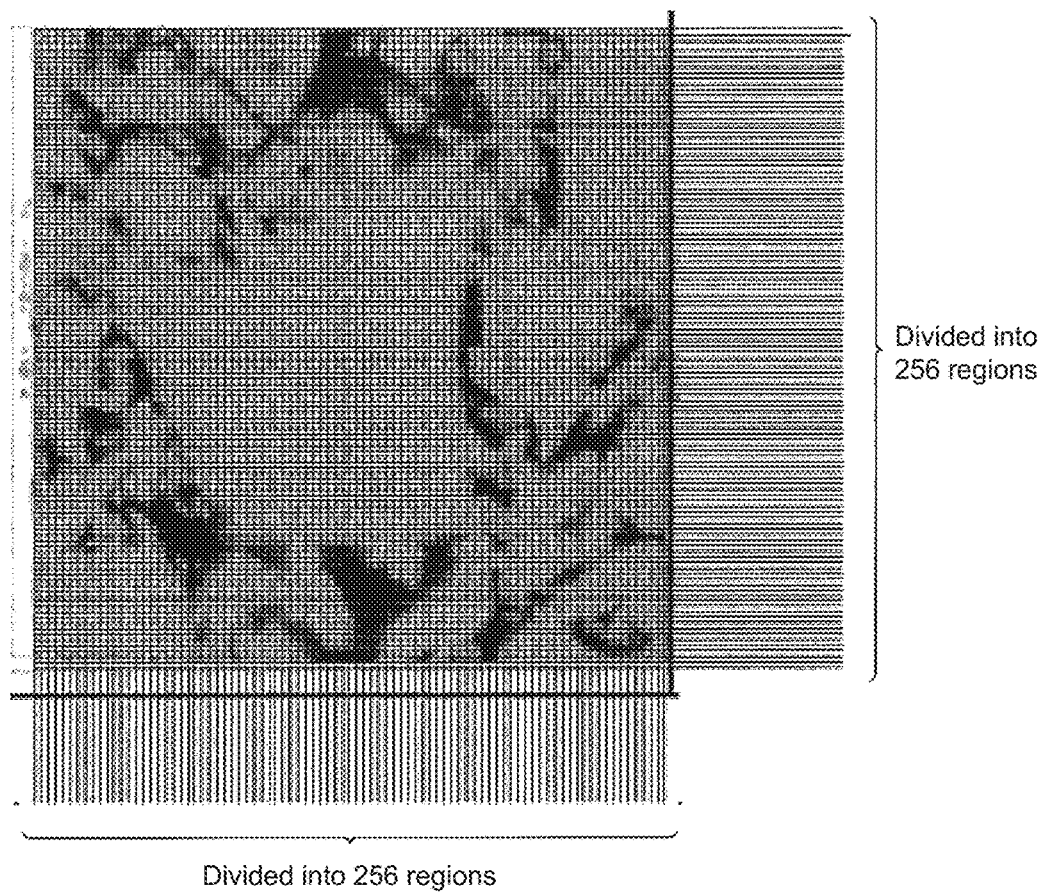
FIG. 10 shows the state of a field of view of an EPMA divided into 256×256 regions.
Figure 11:
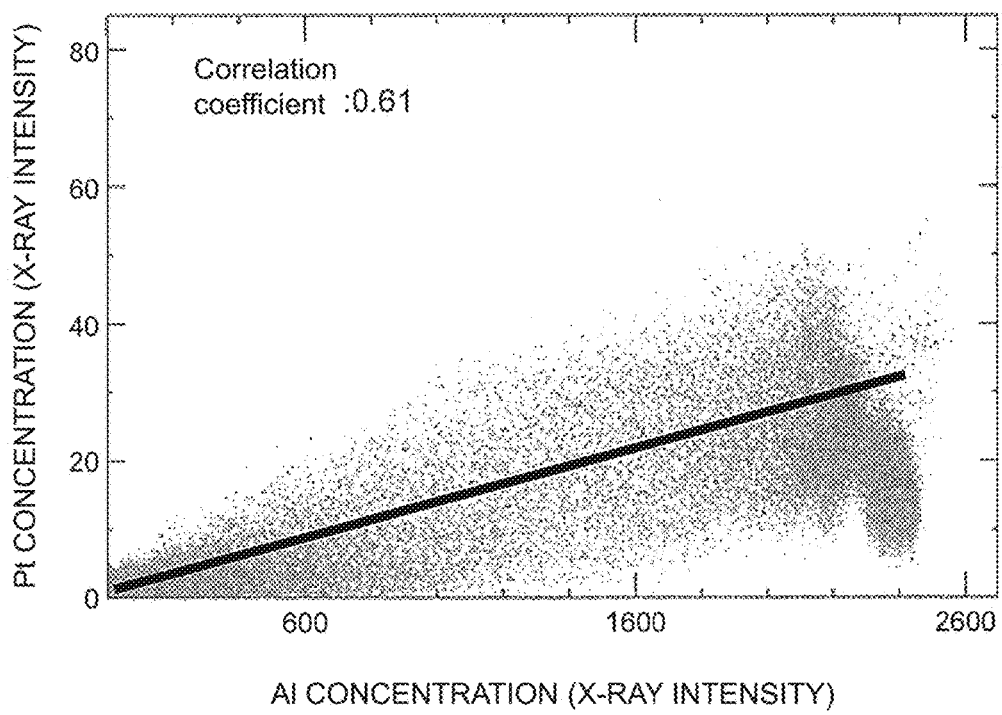
FIG. 11 is a graph showing the correlation between Al and Pt concentrations in Example 1.
Figure 12:
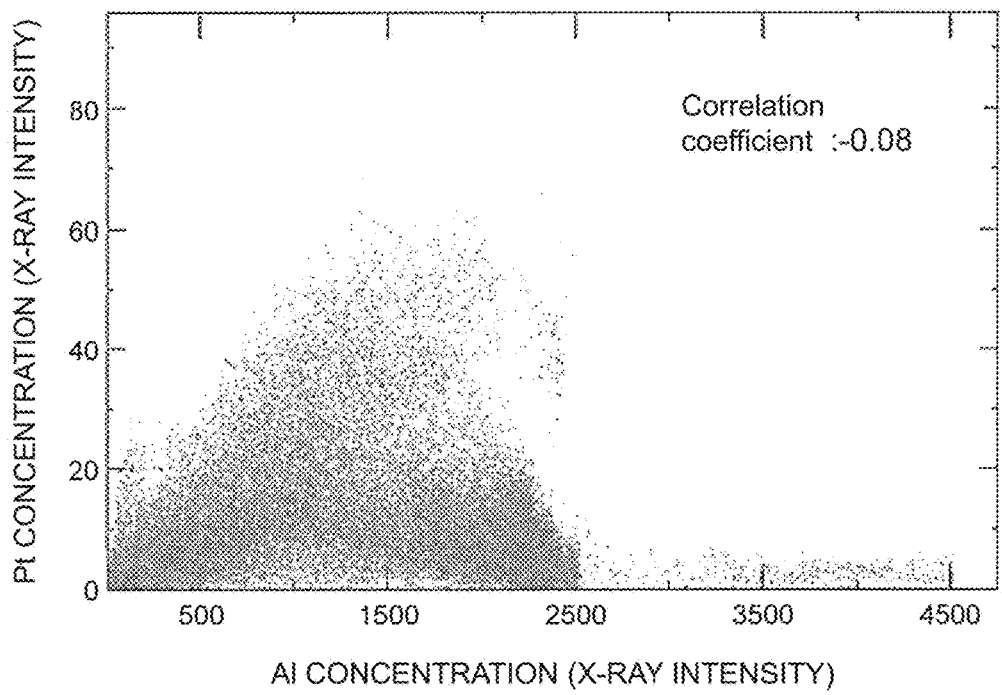
FIG. 12 is a graph showing the correlation between Al and Pt concentrations in Comparative Example 1.
Figure 13:
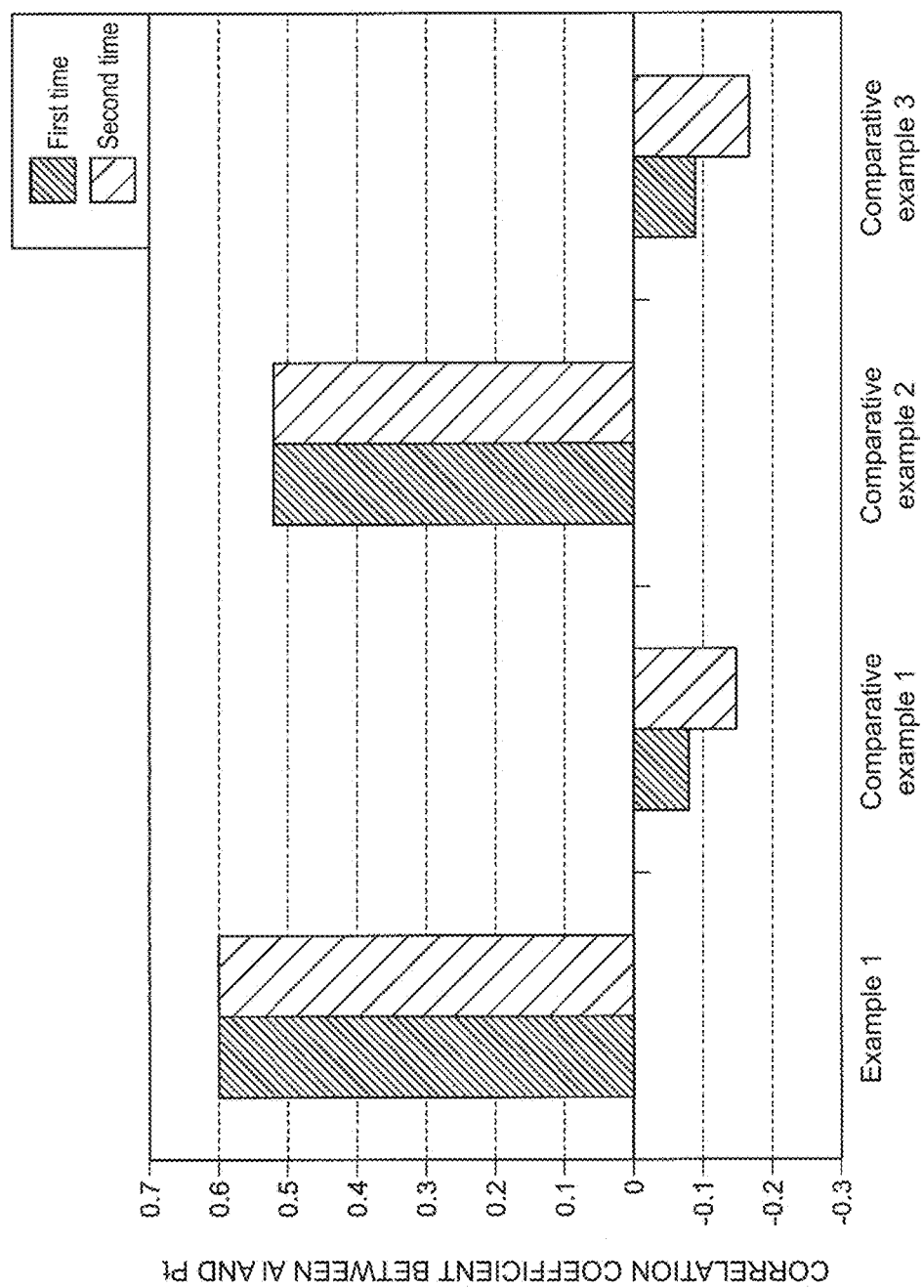
FIG. 13 is a graph showing the correlation coefficients between Al and Pt in each of Example 1 and Comparative Examples 1 to 3.
Figure 14:
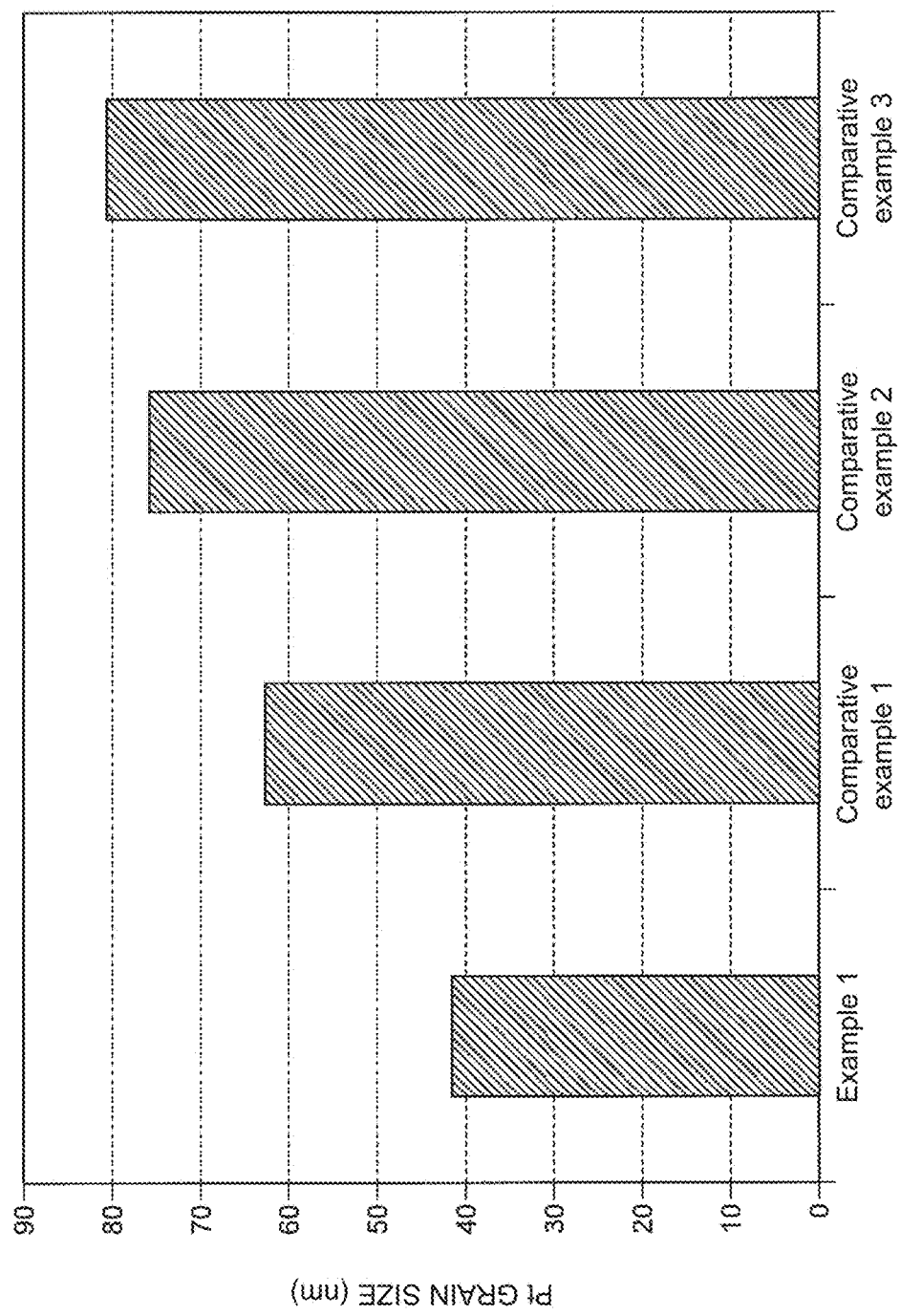
FIG. 14 is a graph showing the Pt grain size of each of Example 1 and Comparative Examples 1 to 3 that is estimated from the full width at half maximum of XRD after endurance at a temperature of 1100° C.
Figure 15:
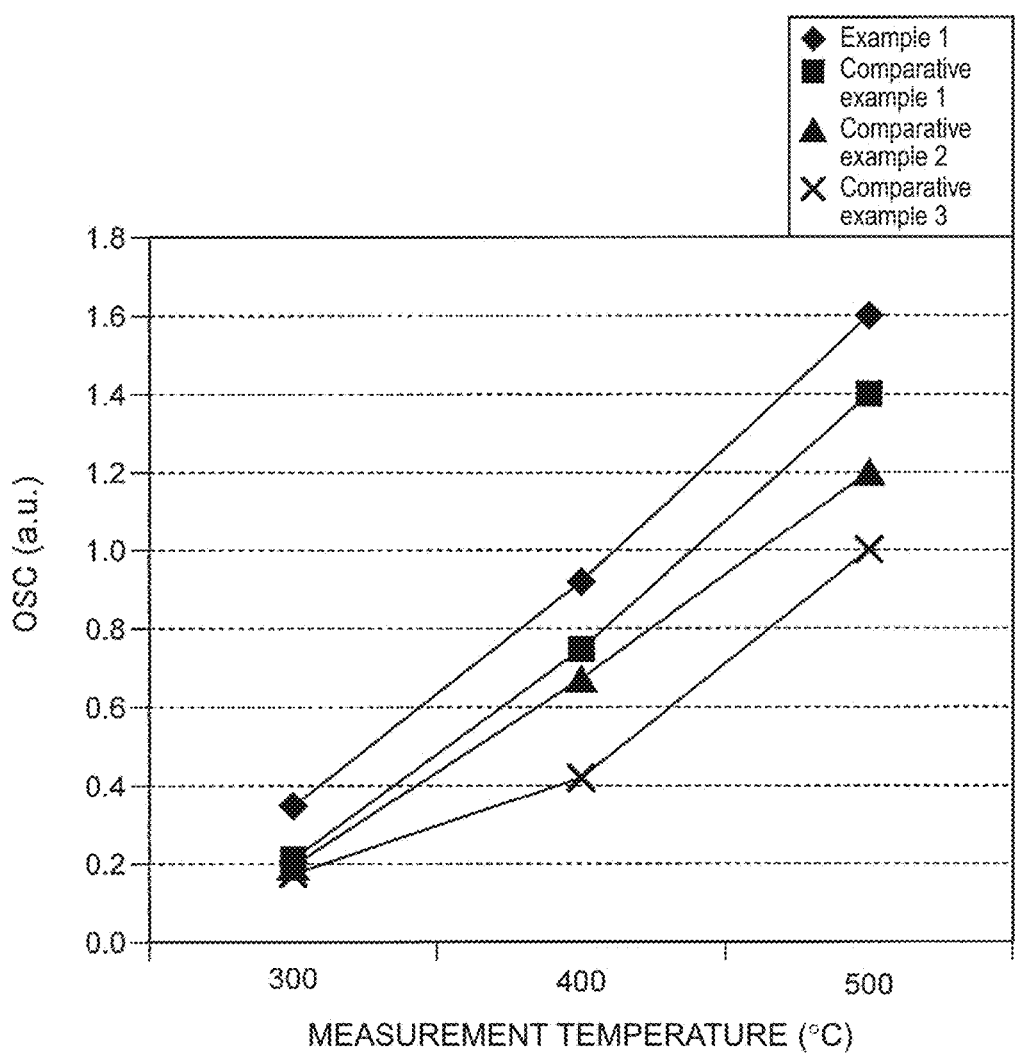
FIG. 15 is a graph showing the OSC measurement results of each of Example 1 and Comparative Examples 1 to 3 after endurance at a temperature of 1100° C.
Figure 16:
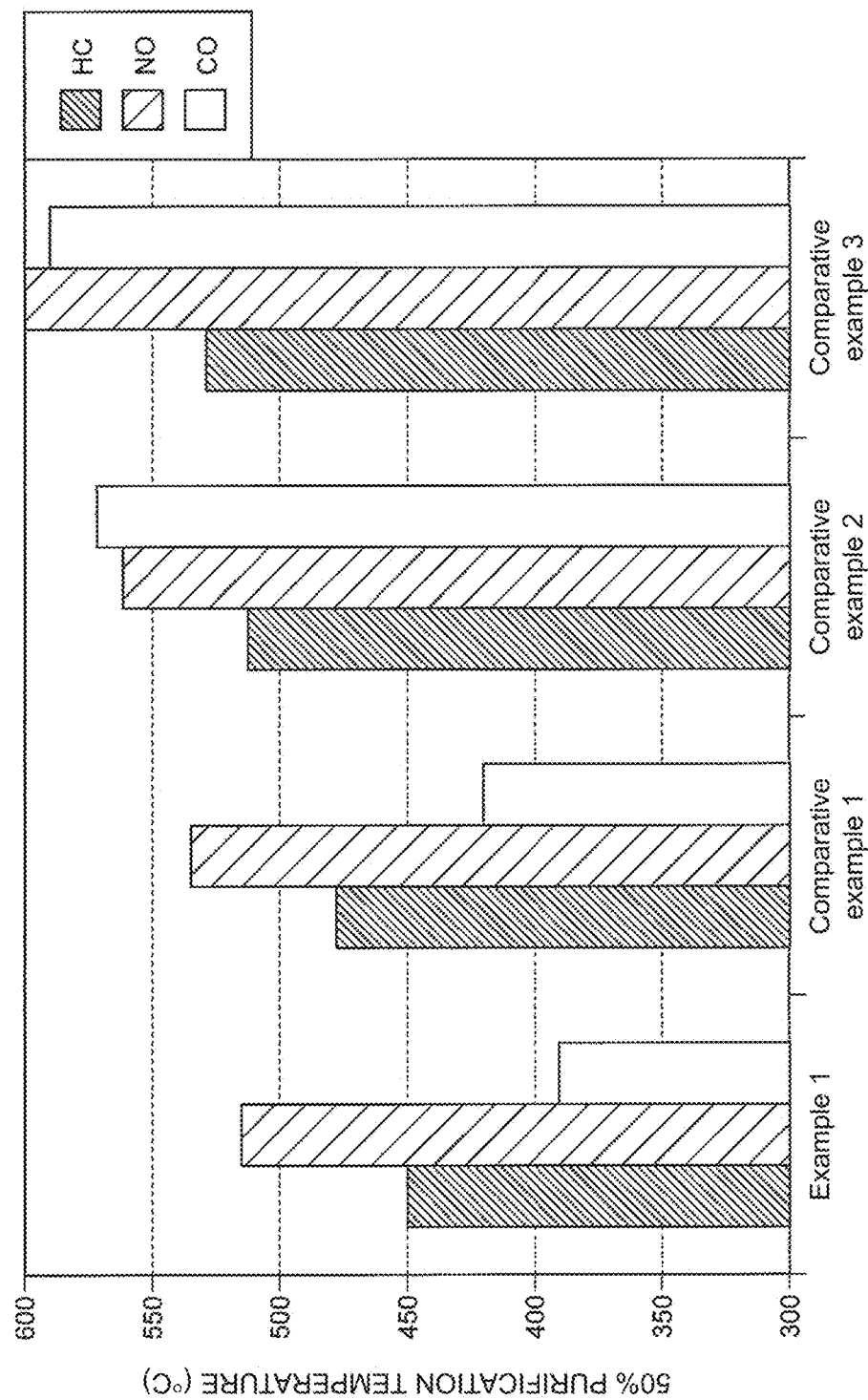
FIG. 16 is a graph showing the 50% purification temperatures of each of Example 1 and Comparative Examples 1 to 3 after endurance at a temperature of 1100° C.

FIG. 9 shows EPMA images of Example 1 and Comparative Example 1. FIG. 10 shows the state of a field of view of an EPMA divided into 256×256 regions. Further, FIG. 11 is a graph showing the correlation between Al and Pt concentrations in Example 1; FIG. 12 is a graph showing the correlation between Al and Pt concentrations in Comparative Example 1; FIG. 13 is a graph showing the correlation coefficients between Al and Pt in each of Example 1 and Comparative Examples 1 to 3; FIG. 14 is a graph showing the Pt grain size of each of Example 1 and Comparative Examples 1 to 3 that is estimated from the full width at half maximum of XRD after endurance at a temperature of 1100° C.; FIG. 15 is a graph showing the OSC measurement results of each of Example 1 and Comparative Examples 1 to 3 after endurance at a temperature of 1100° C.; and FIG. 16 is a graph showing the 50% purification temperatures of each of Example 1 and Comparative Examples 1 to 3 after endurance at a temperature of 1100° C. It should be noted that FIG. 13 shows the correlation coefficients between Al and Pt determined at two different points in all of Example 1 and Comparative Examples 1 to 3.

In the EPMA images shown in FIG. 9, brighter portions indicate that more elements are present. It was seen that in Example 1, brighter portions in the images of Pt and Al coincide with each other, that is, Pt was uniformly supported within the particles, while in Comparative Example 1, Pt was supported less within the particles but more on the outside thereof.

The EPMA view of 87.04×87.04 μm captured by the electron microscope with a magnification of 1000× was divided into 256×256 regions as shown in FIG. 10 and graphs of correlations of the concentrations between Al and Pt at 65536 points were created. Herein, the correlation coefficients were calculated using the following formula:

Correlation coefficient $r = \Sigma(Xn-Xave)(Ym-Yave)/(\Sigma(Xn-Xave)^2 \Sigma(Ym-Yave)^2)^{0.5}$, n,m=1,2 ..., wherein Xn, Xave, Ym, and Yave represent the Al concentration at each point, the average of Al concentrations at all the points, the Pt concentration at each point, and the average of Pt concentrations at all the points, respectively.

FIG. 11 and FIG. 12 show the results of Example 1 and Comparative Example 1, respectively. FIG. 11 confirms that in portions where the Al concentration was high, the Pt concentration was also high, that is, Pt as uniformly and entirely present in the powder. Meanwhile, FIG. 12 confirms that Comparative Example 1 had some portions where the Al concentration was high but the Pt concentration was low (the lower right portion of FIG. 12), that was, Pt was apparently not supported uniformly.

Further, it is clearly understood from FIG. 13 that when a platinum nitric acid chemical solution with a large grain size is used, the correlation coefficient is low, while when a platinum nitric acid chemical solution with a fine grain size is used, the correlation coefficient is high. It should be noted that such a correlation coefficient serves as an index to indicate the difference in the concentrations between Pt within the particles and Pt outside thereof.

Furthermore, FIG. 14 confirms that in Example 1, Pt was supported within the pores with a diameter in the range of 2 to 20 nm of the particles and that, the grain size of Pt of Example 1 as observed through XRD was smaller than that of any of Comparative Examples 1 to 3.

In addition, FIG. 15 confirms that the OSC catalyst activity of Example 1 was significantly higher than that of any of Comparative Examples 1 to 3. FIG. 16 confirms that the 50% purification temperatures of HC, NO, and CO in Example 1 were all lower than those of any of Comparative Examples 1 to 3.

Figure 17A:
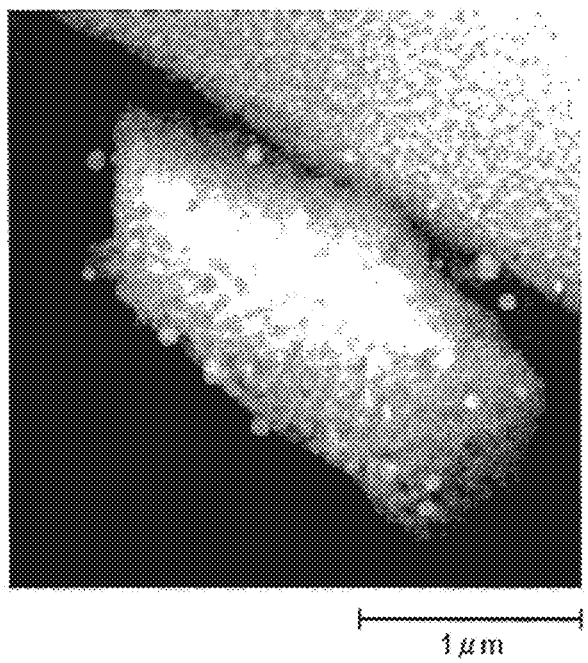
FIG. 17A is a TEM image of Comparative Example 1.

Through direct observation by a TEM of how the sintering of the noble metal catalyst occurred within and outside the actual particle, it was confirmed that Pt within the particle is significantly smaller in size than that outside the particle. Since it was confirmed with the use of the material of Comparative Example 1 that Pt can concurrently be supported outside and within a particle, the particle was sliced for TEM observation and the observation results are shown in FIGS. 17.

Figure 17B:
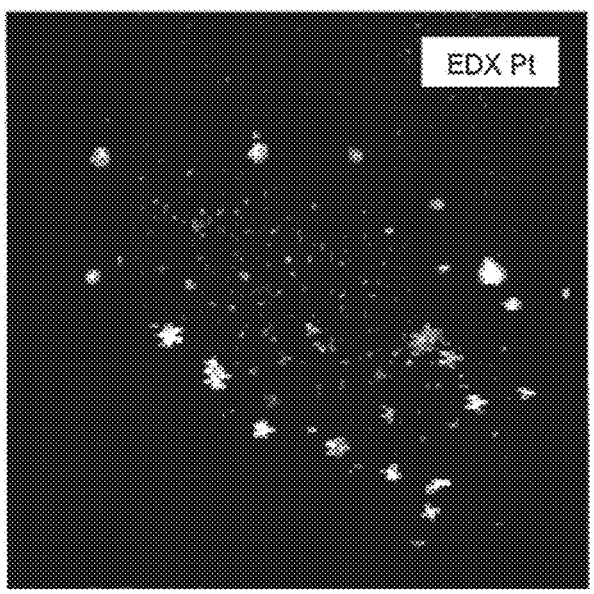
FIG. 17B is a TEM-EDX image of Comparative Example 1.
Figure 18A:
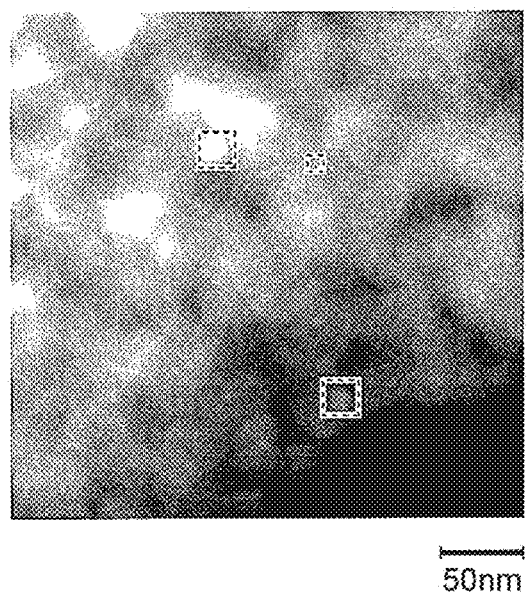
FIGS. 18A, 18B, 18C, and 18D are TEM images of Example 1, Comparative Example 1, Comparative Example 2, and Comparative Example 3, respectively.
Figure 18B:
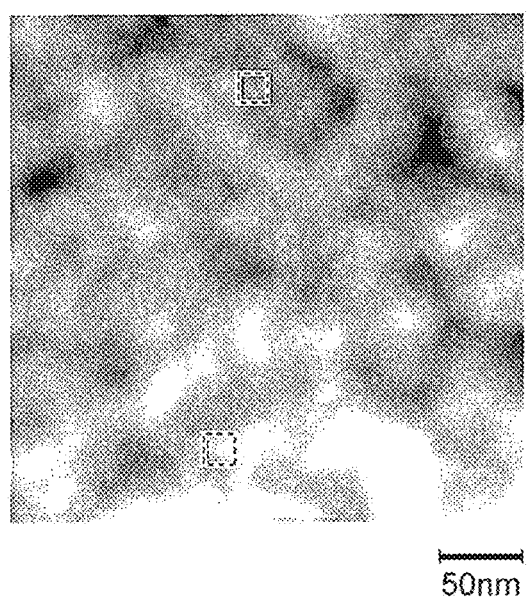
Figure 18C:
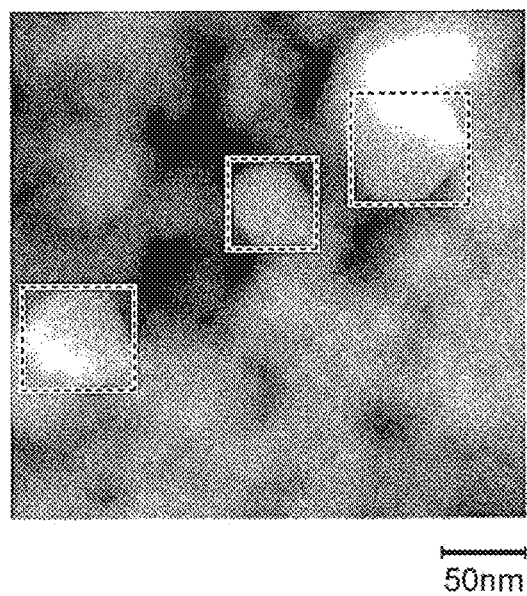
Figure 18D:
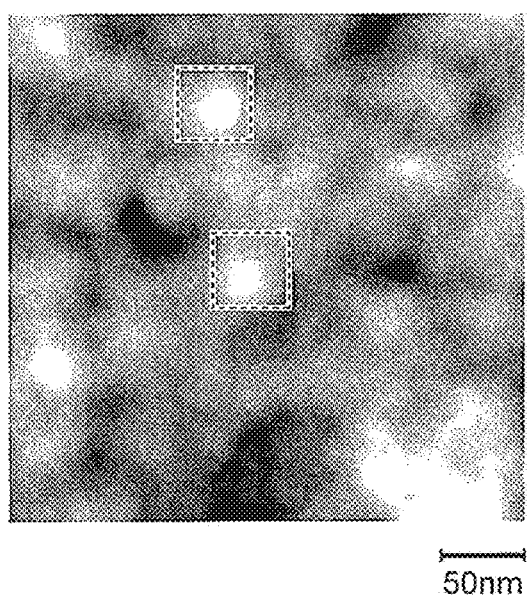

A is a normal TEM observation image, and FIG. 17B is a TEM-EDX image of only Pt grains, and white portions in the images indicate Pt. It is seen that Pt supported on the outer surface of the particle is significantly larger in size as compared to fine Pt supported within the particle. This indicates that when Pt is supported within the particle, the sintering is remarkably suppressed. Estimated values of the Pt grain sizes obtained through XRD shown in FIG. 14 may possibly indicate the average values of the grain sizes of Pt that has greatly sintered on the outer surface of the particle and fine Pt within the particle.

FIGS. 18 shows images of Pt, whose grain size was measured with a TEM, regarding to what extent the grain size of Pt supported within the particle actually varies depending on the difference in the pore diameter of the porous carrier. Specifically, 18A, 18B, 18C, and 18D show the images of Pt grains within the particles of the porous carrier with a peak pore diameter in the range of 2 to 20 nm of Example 1, Pt grains within the particles of the porous carrier with a peak pore diameter in the range of 2 to 20 nm of Comparative Example 1, Pt grains within the particles of the porous carrier with a pore diameter of 30 nm of Comparative Example 2, and Pt grains within the particles of the porous carrier of Comparative Example 3, respectively. It can be understood that the Pt grain size within the particle is only determined by the pore diameter size.

Figure 19:
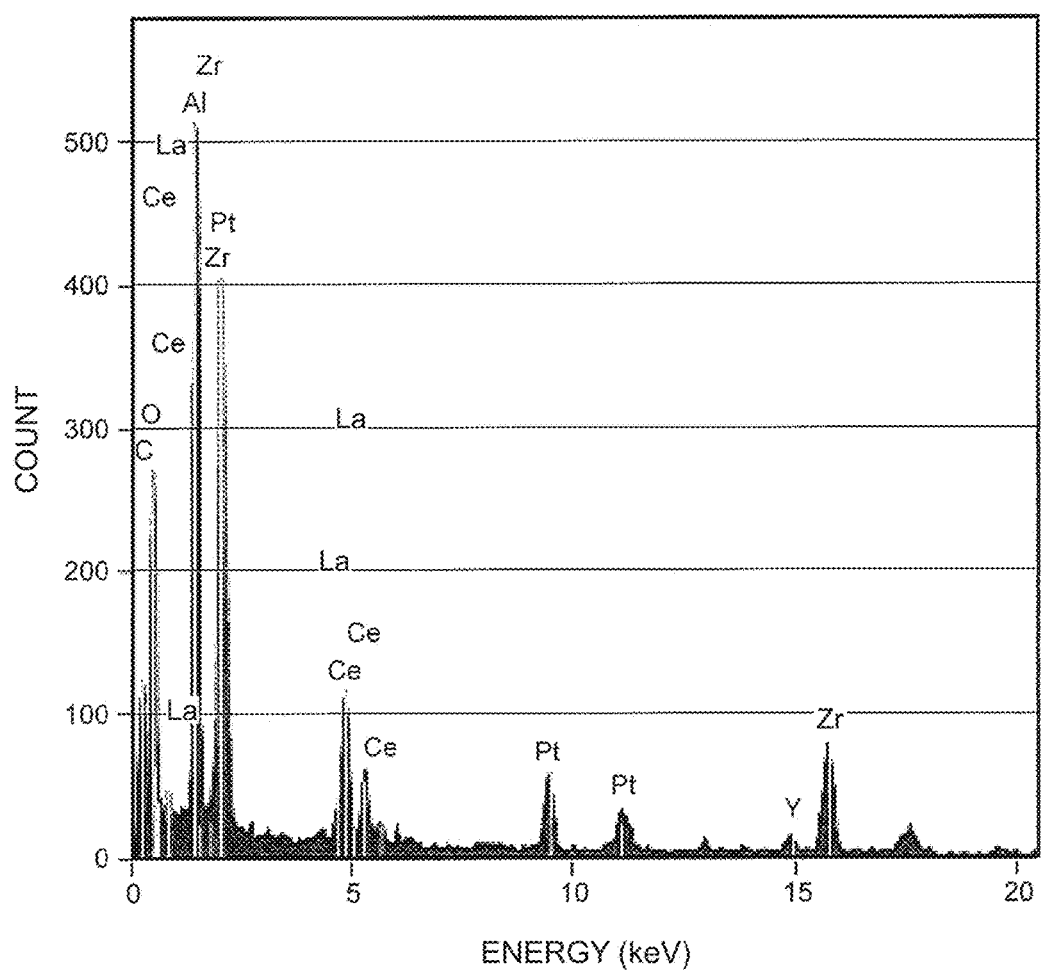
FIG. 19 is a TEM-EDX spectrum.
Figure 20:
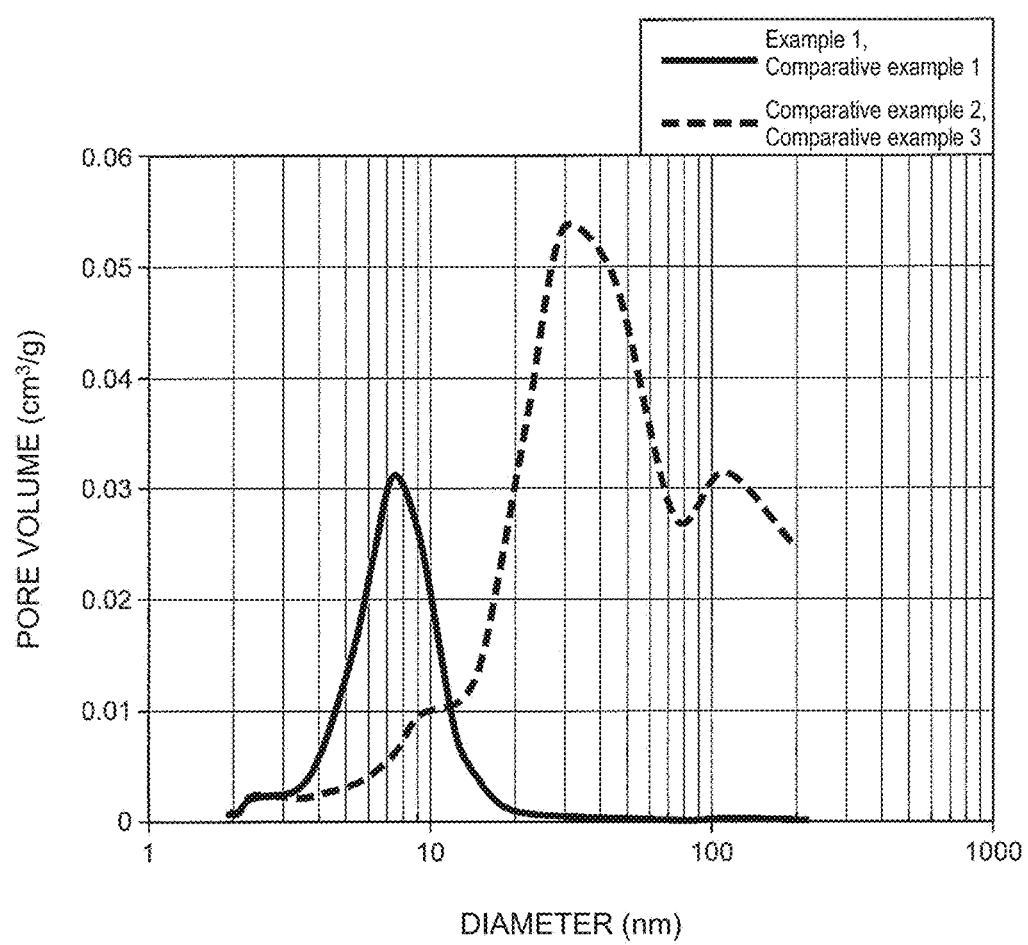
FIG. 20 is a graph showing distributions of pores of aluminum-cerium-zirconium composite oxides.

The direct observation of the inside of the particles also confirmed that Pt within the pore with a diameter in the range of 2 to 20 nm can sinter only to the extent that the Pt grain size reaches around 10 nm, while Pt in the porous carrier that has a distribution of a peak pore diameter of 30 nm grows to the extent that the Pt grain size reaches around 50 nm in relation to the pore distribution. However, since it is difficult to identify Pt only from these images, the presence of Pt grains was confirmed using a TEM-EDX spectrum as shown in FIG. 19.

According to the aforementioned results, it can be understood how important it is to allow the noble metal catalyst to be supported deeply within the porous carrier with a pore diameter in the range of 2 to 20 nm so as not to be supported on the outer surface of the particles as much as possible.

Next, the results obtained through the use of Pd as the noble metal catalyst will be described below.

EXAMPLE 2

A 1 mass % palladium salt that had been prepared so as to have an average grain size of 0.7 nm was supported on an alumina-ceria-zirconia composite oxide with a peak pore diameter in the range of 2 to 20 nm that had been synthesized similarly to Example 1, while nitric acid in a mole amount three times that of Pd was being added thereto.

EXAMPLE 3

A 1 mass % palladium salt that had been prepared so as to have an average grain size of 0.7 nm was supported on an alumina-ceria-zirconia composite oxide with a peak pore diameter in the range of 2 to 20 nm that had been synthesized similarly to Example 1.

COMPARATIVE EXAMPLE 4

A 1 mass % palladium salt that had been prepared so as to have an average grain size of 2.3 nm was supported on an alumina-ceria-zirconia composite oxide with a peak pore diameter in the range of 2 to 20 nm that had been synthesized similarly to Example 1.

COMPARATIVE EXAMPLE 5

A 1 mass % palladium salt that had been prepared so as to have an average grain size of 0.7 nm was supported on an alumina-ceria-zirconia composite oxide with a peak pore diameter of 30 nm that had been synthesized similarly to Comparative Example 2.

RESULTS OF EXPERIMENTS

Figure 21:
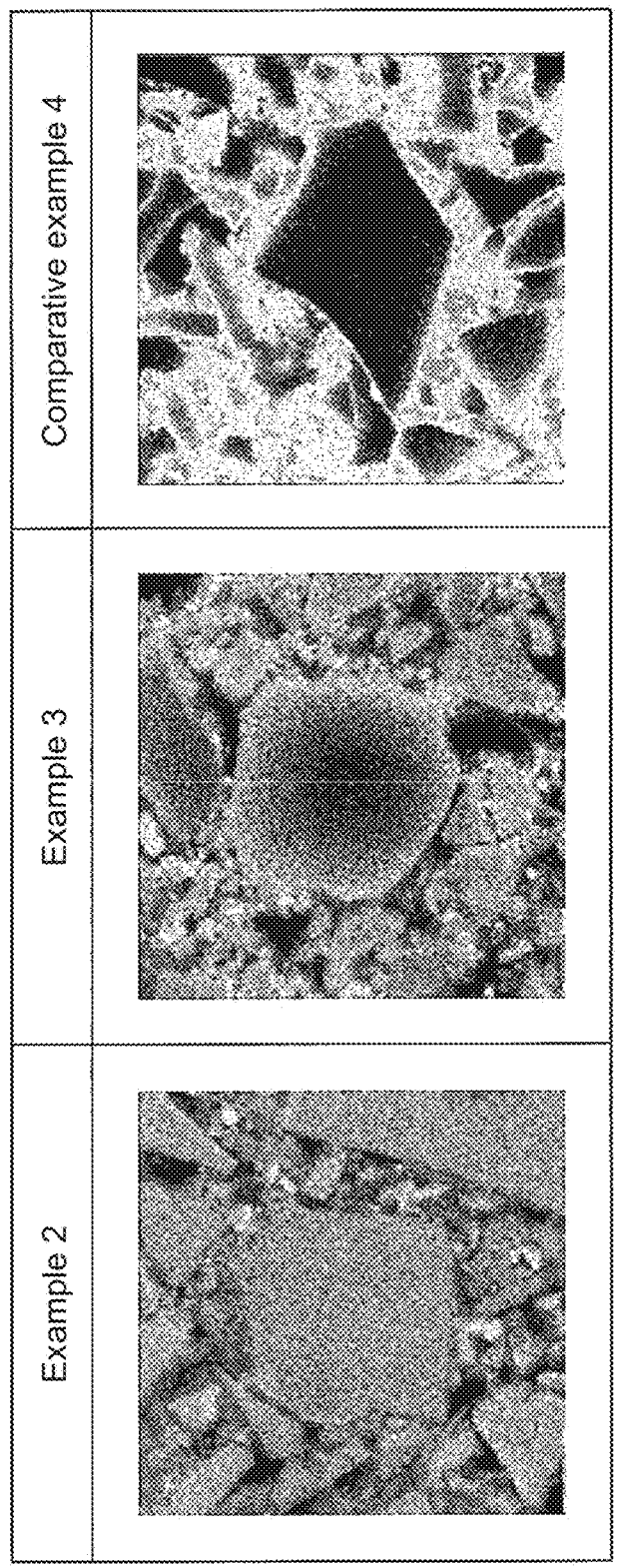
FIG. 21 shows EPMA images of Examples 2 and 3 and Comparative Example 4.
Figure 22:
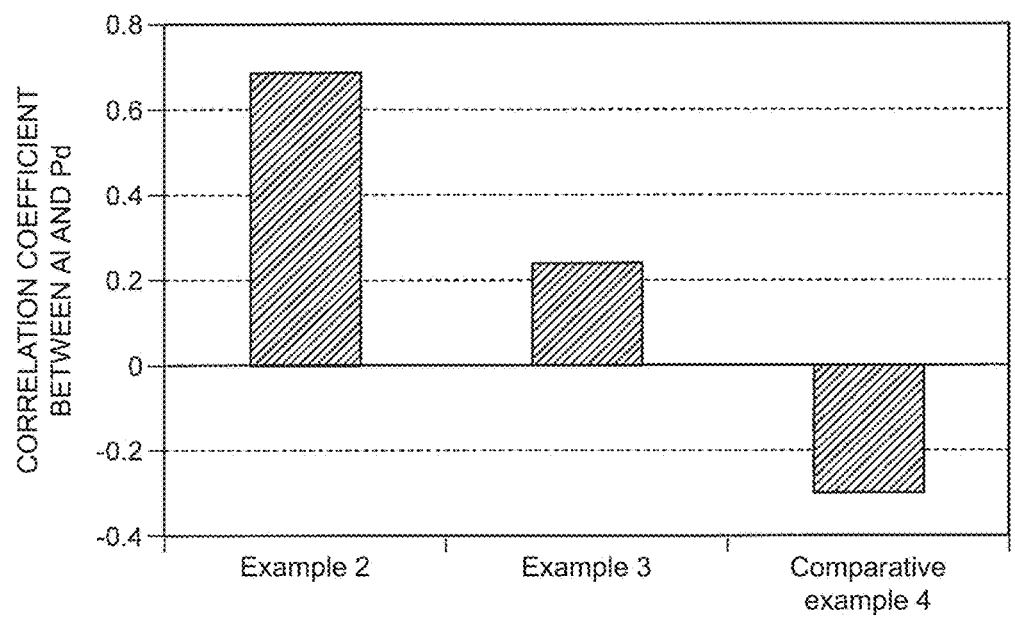
FIG. 22 is a graph showing the correlation coefficient between Al and Pd in each of Examples 2 and 3 and Comparative Example 4.
Figure 23A:
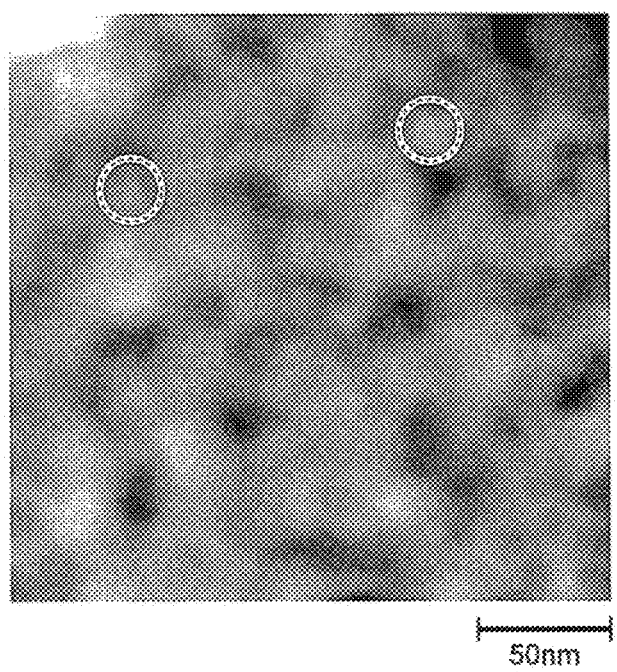
FIGS. 23A and 23B are TEM images of Example 2 and Comparative Example 5 after endurance at a temperature of 1100° C., respectively.
Figure 23B:
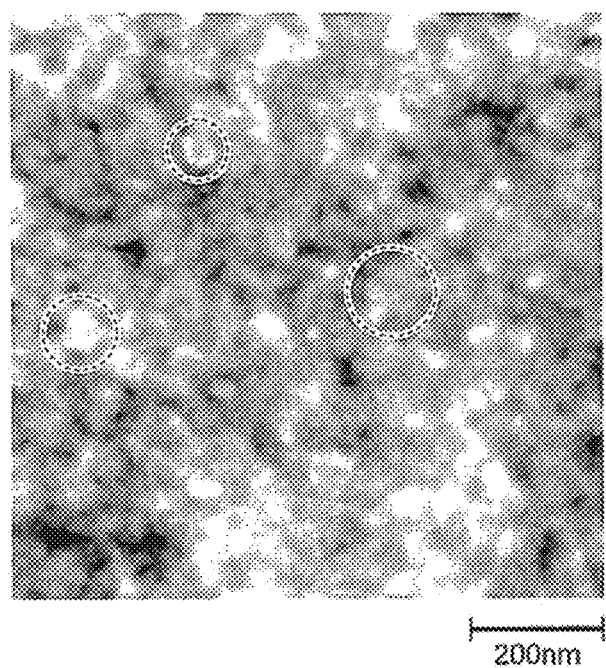
Figure 24:
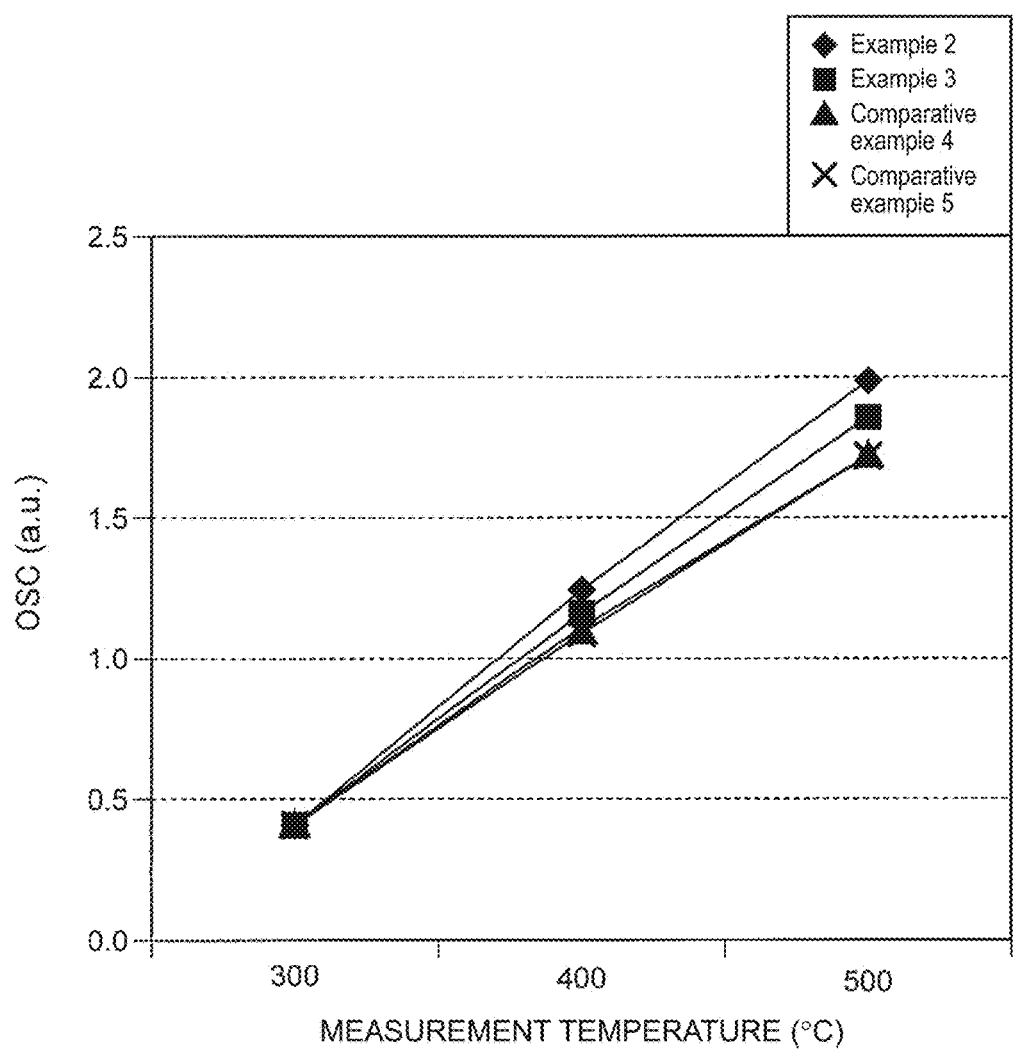
FIG. 24 is a graph showing the OSC measurement results of each of Examples 2 and 3 and Comparative Examples 4 and 5 after endurance at a temperature of 1100° C.

FIG. 21 shows EPMA images of Examples 2 and 3 and Comparative Example 4. FIG. 22 is a graph showing the correlation coefficient between Al and Pd in each of Examples 2 and 3 and Comparative Example 4. Further, FIGS. 23A and 23B are TEM images of Example 2 and Comparative Example 5 after endurance at a temperature of 1100° C., respectively. FIG. 24 is a graph showing the OSC measurement results of each of Examples 2 and 3 and Comparative Examples 4 and 5 after endurance at a temperature of 1100° C.

In FIG. 21, in Examples 2 and 3, brighter portions indicate that the Pd concentrations are higher, while in Comparative Example 4, the brighter portions do not relate to the Pd concentration. This is because the images are shown in black and white. It can be confirmed from the colored images that the brighter portions of Comparative Example 4 do not relate to the Pd concentration.

Further, according to the results of the correlation coefficients between Al and Pd shown in FIG. 22, it can be confirmed that in Example 2, Pd was supported within the particles, and that in Example 3, the correlation coefficient was only above 0.2, but Pd was sufficiently supported as can be seen from the image shown in FIG. 21. In contrast, it can be confirmed that in Comparative Example 4, Pd was scarcely supported within the particles.

According to the aforementioned results, in the exhaust gas purifying catalyst of the present disclosure, the correlation coefficient of the concentrations between the noble metal catalyst and Al of the porous carrier was defined to greater than or equal to 0.2 in each of the 256×256 regions obtained through division of the field of view of 87.04× 87.04 μm of the electron microscope with a magnification of 1000×.

Moreover, to examine the degree of Pd sintering within the particle depending on the pore diameter, the sizes of Pd grains within the particles of Example 2 and Comparative Example 5 after endurance at a temperature of 1100° C. were examined using TEM images of the cross sections of the particles.

From FIG. 23A and FIG. 23B showing the images of Example 2 and Comparative Example 5, respectively, it was confirmed that similarly to the case in which Pt was used as the noble metal catalyst, Pd within the particle can sinter only to the extent that the Pd grain size reaches around 10 nm in Example 2, while Pd in the porous carrier that has a distribution of a peak pore diameter of 30 nm grows to the extent that the Pd grain size reaches around 50 nm in relation to the pore distribution.

Further, the OSC measurement results are shown in FIG. 24, from which it can be confirmed that Examples 2 and 3 exhibit higher OSC performance compared to Comparative Examples 4 and 5.

Next, the results obtained through the use of rhodium (Rh) as the noble metal catalyst will be described below.

EXAMPLE 4

47.1 g $Ce(NO_3)_3 \cdot 6H_2O$ and 52.1 g $ZrO(NO_3)_2 \cdot 2H_2O$ were dissolved in 400 cc distilled water, and the mixture was agitated at 85° C. Then, 80.1 g $Al(OC_3H_7)_3$ was slowly added to the mixture while the dissolution thereof was being checked. After $Al(OC_3H_7)_3$ was dissolved in the mixture, moisture was completely removed at 90° C. with a rotary evaporator, and baking was performed at 900° C. for 5 hours to produce an alumina-ceria-zirconia composite oxide of $Al_2O_3$:$CeO_2$:$ZrO_2$ with a ratio of 32:30:38 having a peak pore diameter less than or equal to 10 nm, so that a 0.3 mass % Rh chemical solution of rhodium nitric acid with a grain size of 0.7 nm was supported on the composite oxide, while nitric acid in a mole amount five times that of Rh was being added thereto. Herein, changing the conditions of preparing the rhodium nitric acid chemical solution can change the degree of polymerization, that is, the size of a rhodium compound. Further, the supporting property can also be changed at the same time. Therefore, it is possible to prepare a noble metal chemical solution suitable for a porous carrier with a specific pore diameter. The grain size of the noble metal chemical solution was measured using a dynamic light scattering (DLS) method with Zetasizer nano-s (produced by Malvern Instruments Ltd.).

COMPARATIVE EXAMPLE 6

A 0.3 mass % Rh chemical solution that had been aged using rhodium nitric acid to the extent that the grain size of the chemical solution reached 2.1 nm was supported on an alumina-ceria-zirconia composite oxide with a peak pore diameter less than or equal to 10 nm that had been synthesized similarly to Example 4.

COMPARATIVE EXAMPLE 7

A 0.3 mass % Rh chemical solution that had been aged using rhodium nitric acid to the extent that the grain size of the chemical solution reached 0.7 nm was supported on an alumina-ceria-zirconia composite oxide with a peak pore diameter less than or equal to 10 nm that had been synthesized similarly to Example 4.

RESULTS OF EXPERIMENTS

Figure 25:
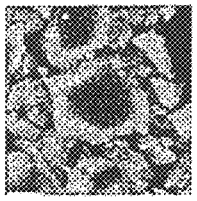
FIG. 25 shows EPMA images of Example 4 and Comparative Examples 6 and 7.
Figure 26:
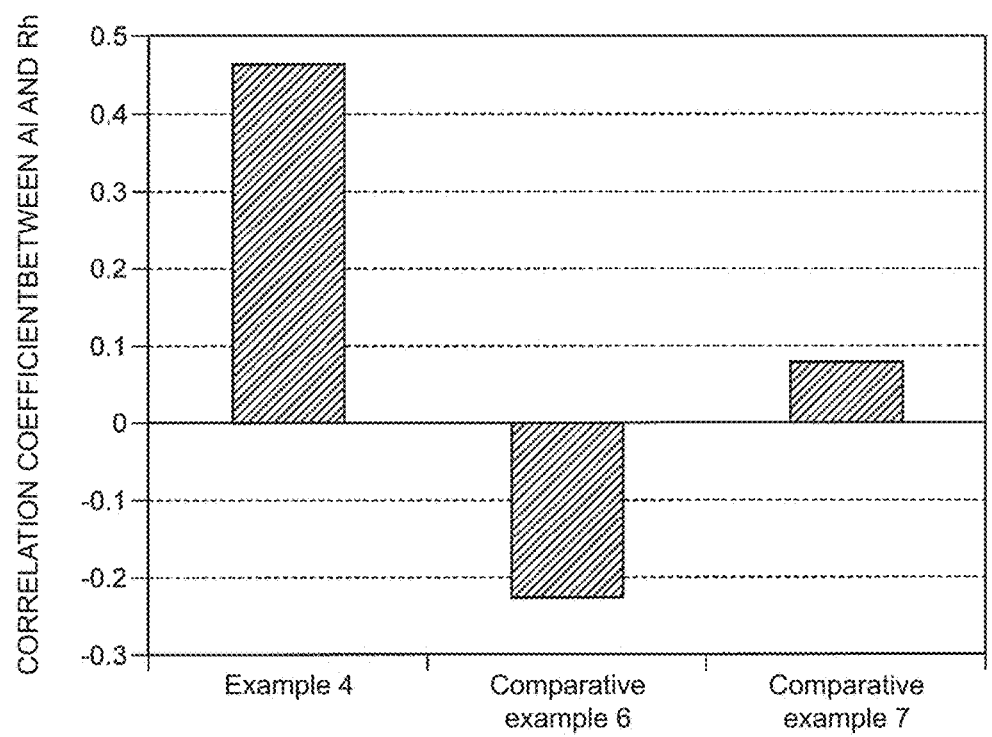
FIG. 26 is a graph showing the correlation coefficient between Al and Rh in each of Example 4 and Comparative Examples 6 and 7.
Figure 27:
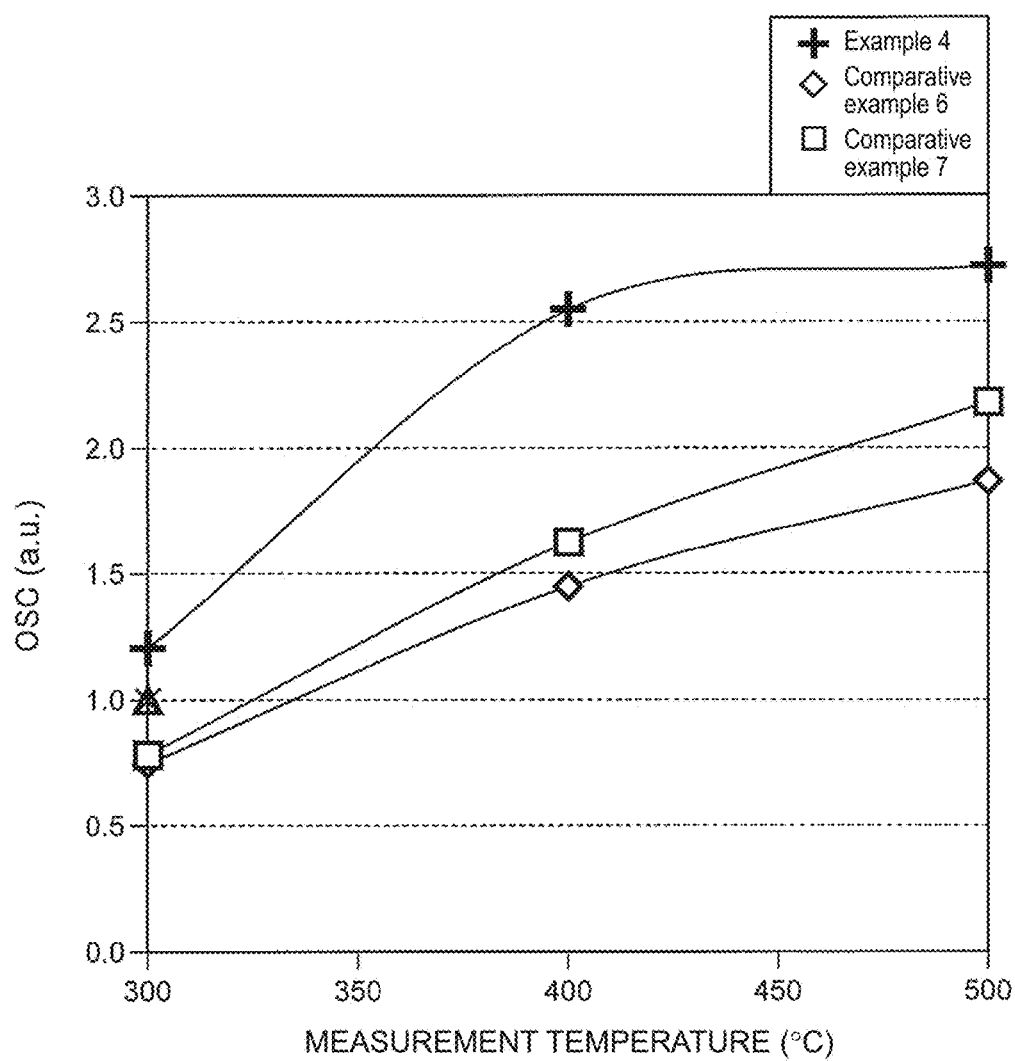
FIG. 27 is a graph showing the OSC measurement results of each of Example 4 and Comparative Examples 6 and 7 after endurance at a temperature of 1100° C.
Figure 28:
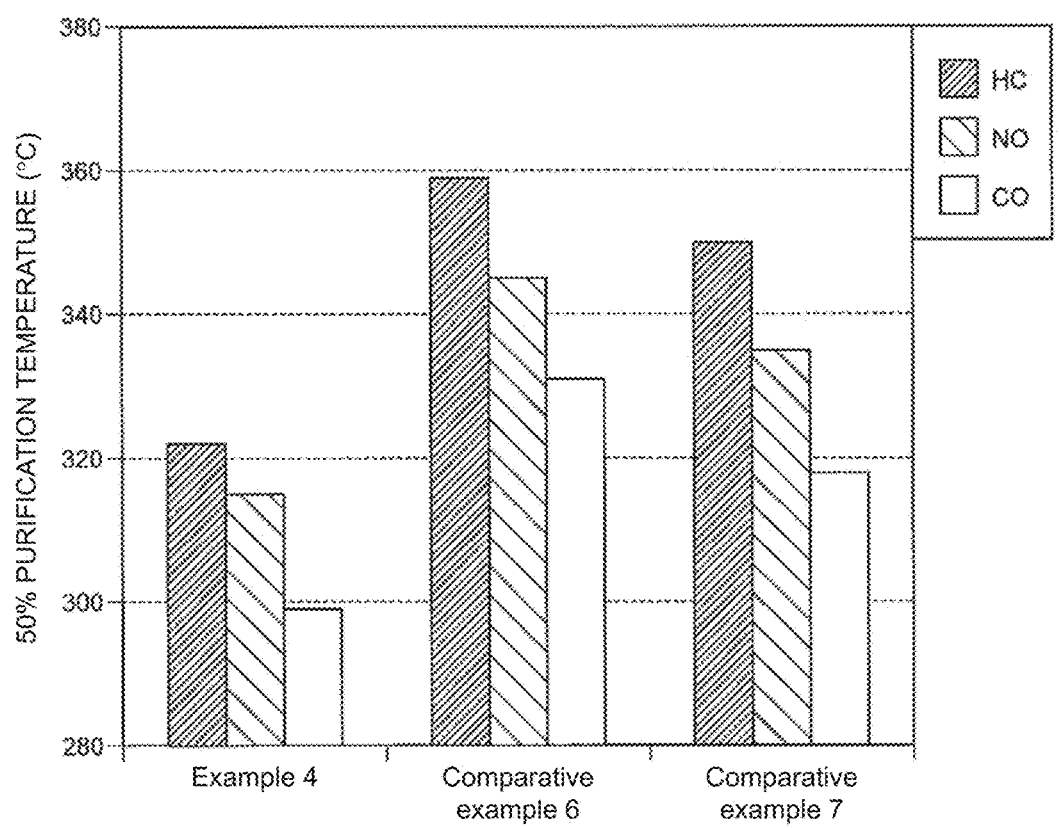
FIG. 28 is a graph showing the measurement results of the 50% purification temperatures of each of Example 4 and Comparative Examples 6 and 7 after endurance at a temperature of 1100° C.

FIG. 25 shows EPMA images of Example 4 and Comparative Examples 6 and 7. FIG. 26 is a graph showing the correlation coefficient between Al and Rh in each of Example 4 and Comparative Examples 6 and 7. Further, FIG. 27 is a graph showing the OSC measurement results of each of Example 4 and Comparative Examples 6 and 7 after endurance at a temperature of 1100° C. FIG. 28 is a graph showing the measurement results of the 50% purification temperatures of each of Example 4 and Comparative Examples 6 and 7 after endurance at a temperature of 1100° C.

FIG. 25 shows an EPMA image of the inside of each of sliced catalyst powders of Example 4 and Comparative Examples 6 and 7. Imaging was performed twice, and the images taken twice of each example are shown on the upper and the lower (n1, n2). Brighter portions indicate that Rh is present more therein. It was confirmed that in Example 4, Rh was supported within the powders to some degree, while in Comparative Examples 6 and 7, Rh was supported less within the powders but more on the outside thereof.

Next, the correlation coefficients of the concentrations between Rh and Al of the composite oxide at 65536 points in each of the 256×256 regions obtained through division of the field of the EPMA view were determined and the results are shown in FIG. 26. According to the results of the correlation coefficients of the concentrations between Al and Rh shown in FIG. 26, in Example 4, Rh was supported within the particles and the correlation coefficient was around above 0.4, which is higher than 0.2, while in Comparative Example 7, Rh was scarcely supported within the particles and the correlation coefficient was less than 0.1, and also in Comparative Example 6, the correlation coefficient was below −0.2. That is, the correlation coefficients in both of the comparative examples were less than 0.2.

Further, the OSC measurement results are shown in FIG. 27, from which it can be confirmed that Example 4 exhibited far higher OSC performance compared to Comparative Examples 6 and 7.

Furthermore, the measurement results of the 50% purification temperatures are shown in FIG. 28. The results demonstrate that Example 4 can purify HC, NO, and CO at a lower temperature around 20 to 40° C. as compared to Comparative Examples 6 and 7.

Although the embodiments of the present disclosure have been described in detail with reference to the drawings, specific structures are not limited thereto, and any design changes that may occur within the spirit and scope of the present disclosure are all included in the present disclosure.

What is claimed is:

1. A method for producing an exhaust gas purifying catalyst including a porous carrier and a noble metal catalyst supported on the porous carrier, the porous carrier containing particles of an alumina-ceria-zirconia composite oxide including ceria-zirconica composite oxide, the method comprising:

preparing the porous carrier having physical property values, after subjected to baking at 900° C. for 5 hours, of a pore diameter of the particles in a range of 2 to 20 nm, a specific surface area of the particles in a range of 75 to 115 m$^2$/g, a crystallite size of the ceria-zirconia composite oxide that is contained in the particles in a range of 4 to 6 nm, and a bulk density of the particles in a range of 0.5 to 0.9 cm$^3$/g; and bringing a noble metal chemical solution into contact with the porous carrier, the noble metal chemical solution having an aggregate of one of platinum, palladium, or rhodium with a grain size adjusted to less than or equal to 1 nm with use of one of a platinum nitric acid solution, palladium nitric acid solution, or rhodium nitric acid solution, so that the noble metal catalyst is supported on the porous carrier.

2. The method according to claim 1, further comprising dissolving a cerium compound and a zirconium compound in distilled water to blend a mixture, and adding aluminum isopropoxide to the mixture to obtain the porous carrier.

3. An exhaust gas purifying catalyst comprising:

a porous carrier; and a noble metal catalyst supported on the porous carrier, wherein:

the porous carrier contains particles of an alumina-ceria-zirconia composite oxide including ceria-zirconia composite oxide, the porous carrier has physical property values, after subjected to baking at 900° C. for 5hours, of a pore diameter of the particles in a range of 2 to 20 nm, a specific surface area of the particles in a range of 75 to 115 m$^2$/g, a crystallite size of a-the ceria-zirconia composite oxide that is contained in the particles in a range of 4 to 6 nm, and a bulk density of the particles in a range of 0.5 to 0.9 cm$^3$/g, and in each of 256 ×256 regions obtained through division of a field of view of 87.04 ×87.04µm of an electron microscope with a magnification of 1000—, a correlation coefficient of concentrations between the noble metal catalyst and Al of the porous carrier is greater than or equal to 0.2.

* * * * *

UNITED STATES PATENT AND TRADEMARK OFFICE
CERTIFICATE OF CORRECTION

PATENT NO. : 10,189,011 B2
APPLICATION NO. : 15/701723
DATED : January 29, 2019
INVENTOR(S) : Takaaki Kanazawa et al.

It is certified that error appears in the above-identified patent and that said Letters Patent is hereby corrected as shown below:

In the Claims

In Claim 3, at Column 20, Line 18:
Delete "a-the" and insert --the--;

In Claim 3, at Column 20, Line 24:
Delete "1000-" and insert --1000×--.

Signed and Sealed this
Ninth Day of April, 2019

Andrei Iancu
*Director of the United States Patent and Trademark Office*